US010621548B2

(12) United States Patent
de Mars et al.

(10) Patent No.: US 10,621,548 B2
(45) **Date of Patent: *Apr. 14, 2020**

(54) REGRESSION-TREE COMPRESSED FEATURE VECTOR MACHINE FOR TIME-EXPIRING INVENTORY UTILIZATION PREDICTION

(71) Applicant: Airbnb, Inc., San Francisco, CA (US)

(72) Inventors: Spencer de Mars, San Francisco, CA (US); Yangli Hector Yee, San Francisco, CA (US); Peng Ye, Foster City, CA (US); Fenglin Liao, San Francisco, CA (US); Li Zhang, Palo Alto, CA (US); Kim Pham, San Francisco, CA (US); Julian Qian, San Francisco, CA (US); Benjamin Yolken, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,569

(22) Filed: Nov. 19, 2019

(65) Prior Publication Data

US 2020/0090116 A1 Mar. 19, 2020

Related U.S. Application Data

(63) Continuation of application No. 15/482,453, filed on Apr. 7, 2017, now Pat. No. 10,528,909.

(Continued)

(51) Int. Cl.

*G06Q 10/08* (2012.01)
*G06Q 10/06* (2012.01)

(Continued)

(52) U.S. Cl.

CPC ............ *G06Q 10/087* (2013.01); *G06N 5/04* (2013.01); *G06N 20/00* (2019.01); *G06Q 10/067* (2013.01); *G06Q 30/0206* (2013.01)

(58) Field of Classification Search

None

See application file for complete search history.

(56) References Cited

U.S. PATENT DOCUMENTS 7,774,226 B2 * 8/2010 Kalagnanm ........ G06Q 10/0637 705/7.31
8,676,632 B1 * 3/2014 Watson ............. G06Q 30/0206 705/1.1

(Continued)

OTHER PUBLICATIONS

Canadian Office Action, Canadian Application No. 2,968,667, Mar. 13, 2018, 4 pages.

(Continued)

*Primary Examiner* — Mehmet Yesildag
(74) *Attorney, Agent, or Firm* — Fenwick & West LLP

(57) ABSTRACT

This disclosure includes systems for regression-tree-modified feature vector machine learning models for utilization prediction in time-expiring inventory. An online computing system receives a feature vector for a listing and inputs the feature vector and modified feature vectors into a demand function to generate demand estimates. The system inputs the demand estimates into a likelihood model to generate a set of request likelihoods, each request likelihood representing a likelihood that the time-expiring inventory will receive a transaction request at each of a set of test price and test times to expiration. The system further trains a regression tree model based on a set of training data comprising each of the request likelihoods from the set and the test price and test time period to expiration used to generate the demand estimate that was used to generate the request likelihood.

14 Claims, 20 Drawing Sheets

Related U.S. Application Data

(60) Provisional application No. 62/325,006, filed on Apr. 20, 2016.

(51) Int. Cl.

| | |
|---|---|
| ***G06N 20/00*** | (2019.01) |
| ***G06Q 30/02*** | (2012.01) |
| ***G06N 5/04*** | (2006.01) |

(56) References Cited

U.S. PATENT DOCUMENTS

| | | | | |
|---|---|---|---|---|
| 9,660,971 | B1* | 5/2017 | Latin-Stoermer | H04L 63/08 |
| 2001/0044766 | A1 | 11/2001 | Keyes | |
| 2005/0004819 | A1* | 1/2005 | Etzioni | G06Q 10/02 705/5 |
| 2005/0065838 | A1* | 3/2005 | Kalagnanm | G06Q 10/0637 705/7.31 |
| 2007/0094171 | A1 | 4/2007 | Burges et al. | |
| 2008/0222132 | A1 | 9/2008 | Pan et al. | |
| 2009/0012955 | A1 | 1/2009 | Chu et al. | |
| 2009/0143977 | A1 | 6/2009 | Beletski et al. | |
| 2011/0295722 | A1* | 12/2011 | Reisman | G06Q 30/0201 705/27.1 |
| 2012/0116844 | A1* | 5/2012 | Menich | G06Q 30/02 705/7.31 |
| 2013/0254035 | A1 | 9/2013 | Ramer et al. | |
| 2014/0067469 | A1* | 3/2014 | Bosworth | G06Q 30/0201 705/7.31 |
| 2014/0278591 | A1 | 9/2014 | Blecharczyk et al. | |
| 2014/0324843 | A1 | 10/2014 | Rapoport et al. | |
| 2016/0055505 | A1* | 2/2016 | Rana | G06O 30/0206 705/5 |

OTHER PUBLICATIONS

"Lecture 10: Regression Trees: 36-350 Data Mining," Oct. 11, 2006, 7 pages.

Barnes, J., "Azure Machine Learning Microsoft Azure Essentials," Azure Machine Learning Microsoft Azure Essentials, Chapter 4, Apr. 25, 2015, 238 pages.

Canadian Intellectual Property Office, Office Action, Canadian Patent Application No. 3,021,196, Jun. 7, 2019, 6 pages.

Japan Patent Office, Office Action, Japanese Patent Application No. 2017/528200, Aug. 6, 2019, 8 pages.

Owen, S. et al., "Mahout in Action," Mahout in Action, Manning Publications, Oct. 17, 2011, ToC, Ch01-Ch17, App, Chapters 5 to 6,400 pages vol. 59.

PCT International Search Report and Written Opinion, PCT Application No. PCT/US2015/062771, Feb. 12, 2016, 10 pages.

PCT International Search Report and Written Opinion, PCT Application No. PCT/US2017/026945, May 29, 2017, 14 pages.

United States Office Action, U.S. Appl. No. 14/952,576, May 17, 2019, 22 pages.

Wikipedia: "Decision Tree Learning," Internet Article, Wikipedia, Mar. 21, 2016, 6 pages, [Online] [Retrieved on May 18, 2017] Retrieved from the Internet<URL:https://en.wikipedia.org/w/index.php?title=Decision_tree_learning&oldid=711201112>.

Wikipedia: "Informatik," Internet Article, Wikipedia, Apr. 19, 2016, 16 pages, [Online] [Retrieved on May 18, 2017] Retrieved from the Internet<URL:https://de.wikipedia.org/w/index.php?title-Informatik&o ldid=153628923>.

United States Office Action, U.S. Appl. No. 15/482,453, dated Jun. 3, 2019, 11 pages.

United States Office Action, U.S. Appl. No. 15/482,453, dated Nov. 30, 2018, 10 pages.

United States Office Action, U.S. Appl. No. 15/482,453, dated Jun. 15, 2018, 14 pages.

* cited by examiner

|   | 1 | 2  410 | 3 | 4  430 | 5 ↑ |   |
|---|---|---|---|---|---|---|
|   | 8 | 9  430 | 10 | 11 | 12 ↑ |   |
|   | 15  420 ↑ | 16 | 17 | 18 | 19 |   |
|   | 22 | 23 | 24  400 | 25 | 26 |   |
|   | 29 | 30 | 31 |   |   |   |
|   | 14  430 |   |   |   |   |   |
|   | 13 | | | | | |

October

| | 1 | 2 | 3 | 4 470A | 5 |
| --- | --- | --- | --- | --- | --- |
| 6 | 7 | 9 430 | 10 | 11 470B | 12 |
| 13 | 14 430 | 16 | 17 | 18 470D | 19 |
| 15 470C 420 | 22 440 | 23 | 24 400 | 25 | 26 |
| 20 | 21 | | | | |
| 27 | 28 | 30 | 31 | | |

*(Labels visible: 410, 430, 460, 440, 400, 420, 470A, 470B, 470C, 470D)*

October

Training Store 256

| | Label | Feature 1 | Feature 2 | Feature 3 | ... | Feature m |
|---|---|---|---|---|---|---|
| Training Sample 1 | 1 | 14 | 100 | Detroit | | 1 |
| Training Sample 2 | 1 | 7 | 75 | LA | | 0 |
| Training Sample 3 | -1 | 5 | 220 | SF | | 0 |
| Training Sample 4 | 1 | 24 | 140 | New York | | 1 |
| Training Sample 5 | -1 | 3 | 300 | Seattle | | 0 |
| ... | | | | | | |
| Training Sample N | -1 | 18 | 75 | Portland | | 1 |

500

| | Label | Days Until Expiration | Price | City | WiFi |
|---|---|---|---|---|---|
| 470A | 1 | 20 | 120 | SF | 1 |
| 470B | 1 | 13 | 100 | SF | 1 |
| 470C | 1 | 9 | 100 | SF | 1 |
| 470D | -1 | 6 | 90 | SF | 1 |

Price Example Feature Model

Days Until Expiration Example
Feature Model

Pricing Model 320

REGRESSION-TREE COMPRESSED FEATURE VECTOR MACHINE FOR TIME-EXPIRING INVENTORY UTILIZATION PREDICTION

CROSS REFERENCE TO RELATED APPLICATIONS

This application is a continuation of co-pending U.S. application Ser. No. 15/482,453, filed Apr. 7, 2017, which claims the benefit of U.S. Provisional Application No. 62/325,006 filed Apr. 20, 2016, the entirety of which are incorporated by reference.

TECHNICAL FIELD

This application relates generally to feature vector machine learning models and data analysis in the context of time-expiring inventory, and particularly to the application of regression-trees to feature vector machine outputs for utilization prediction relating to time-expiring inventory.

BACKGROUND

In a typical transaction for a good or service, the manager that controls or owns the good sets the price of the good and waits for an interested party to agree to pay the proposed price. Oftentimes the manager fails to correctly price the good but because of incomplete information in the market and other economic factors someone may eventually agree to pay the price. However, pricing time-expiring inventories is a more challenging endeavor because if the inventory is not sold or utilized before it expires, the inventory is wasted and the manager receives no revenue. Thus, a manager of time expiring inventory is susceptible to either pricing their inventory too high and risk losing revenue from expiration, or pricing their inventory too low and receiving suboptimal revenue but with good utilization. Additionally, the ideal or desired market-clearing price for a time-expiring inventory may change as the inventory approaches its expiration date. This combination of factors makes it difficult for a manager of a time-expiring inventory to optimally price their inventory.

SUMMARY

An online system enables managers to create listings for time-expiring inventories and enables clients to submit a transaction request to reserve, lease, or buy a listed time-expiring inventory. The online system estimates demand for a listing of a time-expiring inventory. The online system defines a set of features that describe the time-expiring inventory, the associated listing, and the market for the time-expiring inventory. A set of these descriptive features is a feature vector for a listing. The online system estimates demand for a listing by inputting the feature vector of that listing into a demand function.

The demand function may be comprised of a feature model for each feature of the feature vector where each feature in the feature vector is associated with a feature model. The demand function may be a generalized additive model that sums the feature models to generate the demand estimate. The online system may train the demand function using training data where each sample from the training data comprises a binary label describing whether the time-expiring inventory of the listing received a transaction request from a client before it expired as well as a feature vector describing the listing of the time-expiring inventory at each sample time. The online system may collect a plurality of samples for a single listing where each sample corresponds to the features of the listing for the time-expiring inventory during a time period before the expiration of the time-expiring inventory.

The online system may then use a likelihood model to convert the demand estimate to a likelihood of receiving a transaction request from a client. The online system generates a set of test prices that are greater than or less than a pivot price (e.g., the current price) of the time-expiring inventory at each of a set of test times to expiration that are greater than or less than a pivot time to expiration (e.g., the current time to expiration). The online system then inputs, into the demand function, modified feature vectors of the listing of the time-expiring inventory each modified feature vector having a different test price and test time to expiration combination. The demand function generates a set of test demand estimates, which the online system converts to a set of test likelihoods using the likelihood model.

The online system may then fit and train a regression tree on the set of test likelihoods. The regression-tree compression of the feature vector machine outputs of the test likelihoods and the corresponding test prices and test times to expiration that resulted in the test likelihood may be used to predict the utilization of the time-expiring inventory.

BRIEF DESCRIPTION OF THE DRAWINGS

FIG. 5 illustrates example stores for storing the training data used by the demand module in accordance with one embodiment.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
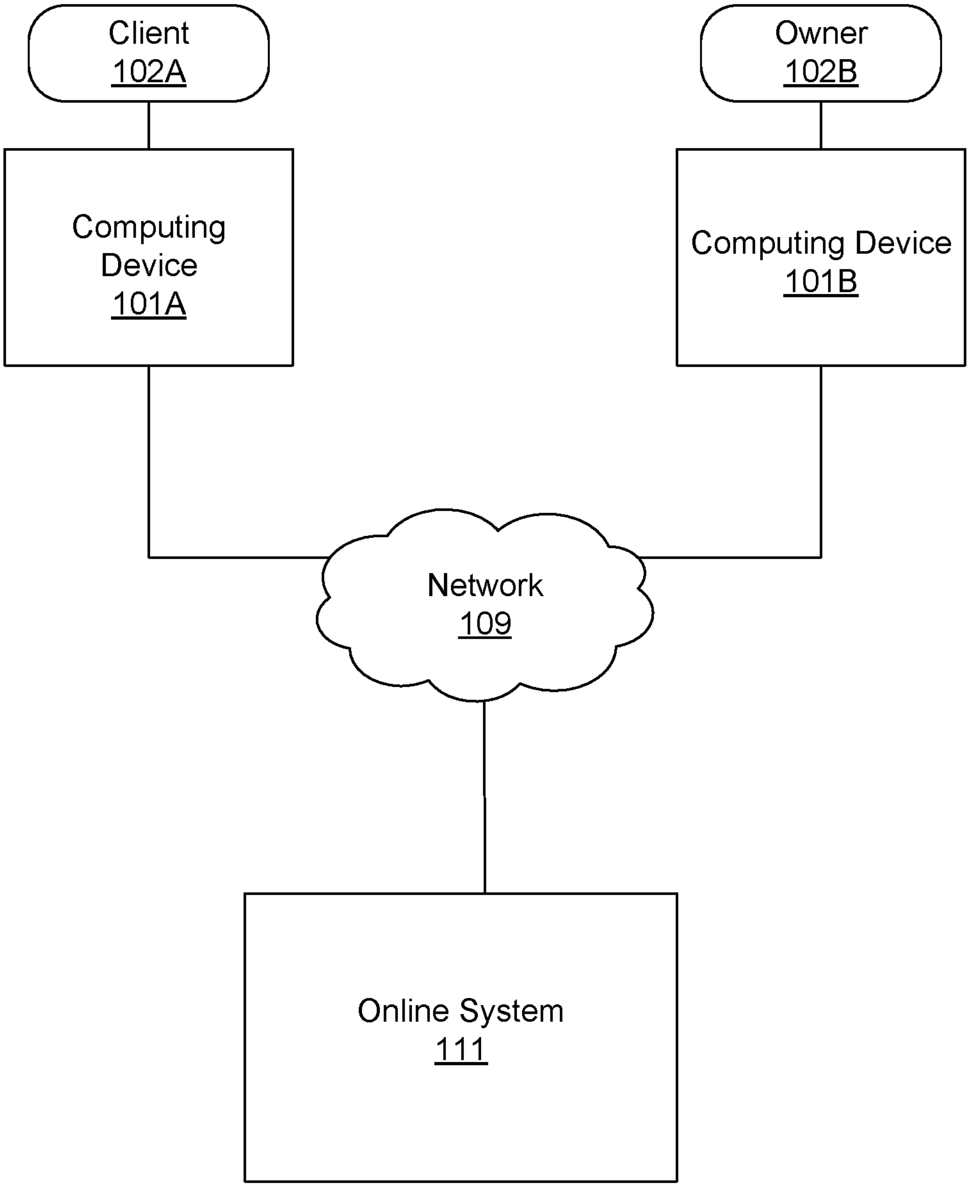
FIG. 1 is a block diagram of a computing environment including an online system that makes available time-expiring inventory for booking, in accordance with one embodiment.

FIG. 1 is a block diagram of a computing environment including an online system for providing time-expiring inventory for purchase, rental, lease, reservation, etc. in accordance with one embodiment. The network 109 represents the communication pathways between one party to a transaction, herein referred to as clients 102A and the other party to the transaction, herein referred to as managers 102B.

For clarity of explanation, clients includes potential purchasers for value, renters, lessees, clients holding a reservation, or any other party providing consideration in exchange for access to, in whatever form, the time-expiring inventory. For clarity of explanation, managers includes the sellers of an item of time expiring inventory, landlords and property owners who manage property on behalf of the landlord, lessors, those managing reservation inventory such as ticket salesman or restaurant or hotel booking staff, or any other party receiving consideration in exchange for providing access (in whatever form) to the time expiring inventory. Depending upon the type of time-expiring inventory being transacted for, the time-expiring inventory may be being sold, leased, reserved, etc. For clarity of explanation, these different types of transactions are herein referred to as "bookings" to provide one convenient term for the whole set of possible types of transactions.

The online system 111 includes one or more computing devices that couples the computing devices 101 associated with the clients and managers across the network 109 to allow the clients and managers to virtually interact over the network 109. In one embodiment, the network is the Internet. The network can also utilize dedicated or private communication links (e.g. wide area networks (WANs), metropolitan area networks (MANs), or local area networks (LANs)) that are not necessarily part of the Internet. The network uses standard communications technologies and/or protocols.

The computing devices 101 are used by the clients and managers for interacting with the online system 113. A computing device 101 executes an operating system, for example, a Microsoft Windows-compatible operating system (OS), Apple OS X or iOS, a Linux distribution, or Google's Android OS. In some embodiments, the client device 101 may use a web browser 113, such as Microsoft Internet Explorer, Mozilla Firefox, Google Chrome, Apple Safari and/or Opera, as an user-friendly graphical interface with which to interact with the online system 111. In other embodiments, the computing devices 101 may execute a dedicated software application for accessing the online system 111.

The online system 111 provides a computing platform for clients and managers to interact via their computing devices 101 to transact for time-expiring inventory. The online system 111 may support, for example, a restaurant dining online system (or any other kind of online system such as a plane or train seat online system, a hotel online system or a day spa online system), a ride-share (carpool) online system, an accommodation online system, and the like.

The online system 111 provides managers with the ability to create listings for time-expiring inventory. A listing may be created for each individual instance of a time-expiring inventory, such as each seat for each plane for each flight offered by an airline online system. Alternatively, a listing may be created for a particular piece of inventory irrespective of time, and then the listing may be transacted for units of time that expire when those units of time have already passed. In this case, the listing is common to a set of time-expiring inventory, each item of time-expiring inventory in the set varying from the other only in the time/date ranges which is being transacted for. For example, for a real estate rental system, a listing may be for a particular apartment or condominium, and clients and managers may transact for different units of time (e.g., dates) associated with that apartment or condominium.

Generally, though not necessarily, each listing will have an associated real-world geographic location associated with the listing. This might be the location of a property for a rent, or a location of a restaurant for a reservation and possibly the specific table to be reserved. The online system 111 further provides managers with online software tools to help the managers manage their listings, which include providing information on actual and predicted demand for listings, as well as tips that empower managers with information they can opt to use to improve the utilization and/or revenue of a particular listing.

The online system provides clients with the ability to search for listings, communicate with managers regarding possible transactions, formally or informally request that a transaction take place (e.g., make an offer), and actually perform a transaction (e.g., buy, lease, reserve) with respect to a listing. The online system 111 comprises additional components and modules that are described below.

II. Online System

Figure 2:
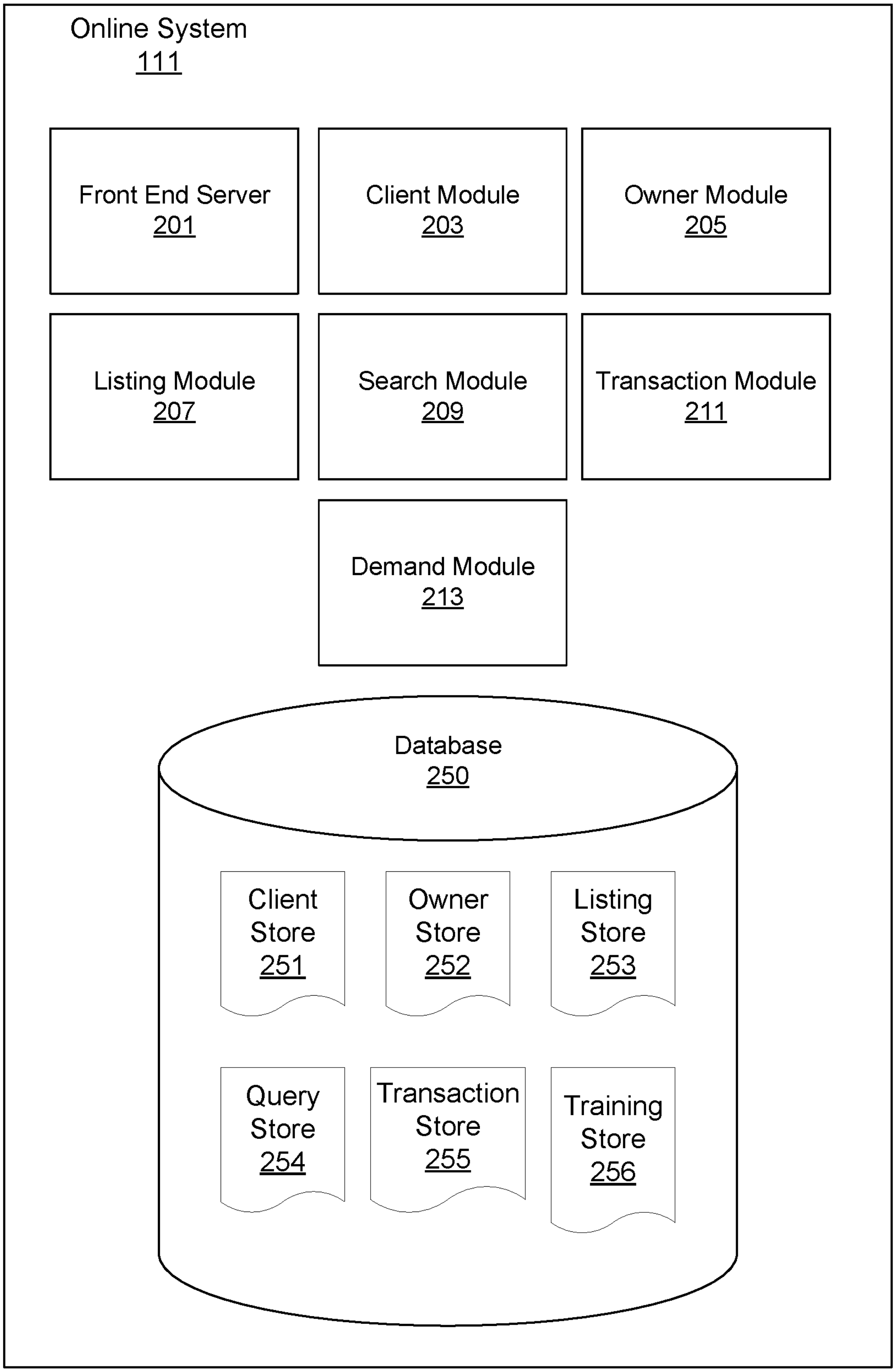
FIG. 2 is a block diagram of the logical components of the online system in accordance with one embodiment.

FIG. 2 is a block diagram of the logical components of the online system 111, in accordance with one embodiment. The online system 111 comprises a front end server 201, a client module 203, a manager module 205, a listing module 207, a search module 209, a transaction module 211, a demand module 213, and a database 250. Those of skill in the art will further appreciate that the online system 111 may also contain different and other modules that are not described herein. In addition, conventional elements, such as firewalls, authentication systems, payment processing systems, network management tools, load balancers, and so forth are not shown as they are not directly material to the subject matter described herein.

The online system 111 may be implemented using a single computing device, or a network of computing devices, including cloud-based computer implementations. The computing devices are preferably server class computers including one or more high-performance computer processors and random access memory, and running an operating system such as LINUX or variants thereof. The operations of the online system 111 as described herein can be controlled through either hardware or through computer programs installed in non-transitory computer readable storage devices such as solid state drives or magnetic storage devices and executed by the processors to perform the functions described herein. The database 250 is implemented using non-transitory computer readable storage devices, and suitable database management systems for data access and retrieval. The online system 111 includes other hardware elements necessary for the operations described herein, including network interfaces and protocols, input devices for data entry, and output devices for display, printing, or other presentations of data. Additionally, the operations listed here are necessarily performed at such a frequency and over such a large set of data that they must be performed by a computer in order to be performed in a commercially useful amount of time, and thus cannot be performed in any useful embodiment by mental steps in the human mind.

The database 250 includes a client data store 251, a manager data store 252, a listing data store 253, a query data store 254, a transaction data store 255, and a training data store 256. Those of skill in the art will appreciate that these data stores are not components of a generic database, and that database 250 may contain other data stores that are not explicitly mentioned here. The database may be implemented using any suitable database management system such as MySQL, PostgreSQL, Microsoft SQL Server, Oracle, SAP, IBM DB2, or the like.

The front end server 201 includes program code that client and manager computing devices 101 to communicate with the online system 111, and is one means for doing so. The front end server 201 may include a web server hosting one or more websites accessible via a hypertext transfer protocol (HTTP), such that user agents such as web browser software applications that may be installed on the computing devices 101 can send commands and receive data from the online system. The front end server 201 may also make available an application programming interface (API) that allows software applications installed on the computing devices 101 to make calls to the API to send commands and receive data from the online system. The front end server 201 further includes program code to route commands and data to the other components of the online system 111 to carry out the processes described herein and respond to the computing devices 101 accordingly.

II.A Clients and Managers

The client module 203 comprises program code that allows clients to manage their interactions with the online system 111, and executes processing logic for client related information that may be requested by other components of the online system 111, and is one means for doing so. Each client is represented in the online system 111 by an individual client object having a unique client ID and client profile both of which are stored in client store 251. The client profile includes a number of client related attribute fields that may include a profile picture and/or other identifying information, a geographical location, and a client calendar. The client module 203 provides code for clients to set up and modify their client profile. The online system 111 allows each client to communicate with multiple managers. The online system 111 allows a client to exchange communications, requests for transactions, and transactions with managers.

The client's geographic location is either a client's current location (e.g., based on information provided by their computing device 101), or their manually-entered home address, neighborhood, city, state, or country of residence. The client location that may be used to filter search criteria for time-expiring inventory relevant to a particular client or assign default language preferences.

The manager module 205 comprises program code that provides a user interface that allows managers to manage their interactions and listings with the online system 111 and executes processing logic for manager related information that may be requested by other components of the online system 111, and is one means for doing so. Each manager is represented in the online system 111 by an individual manager object having a unique manager ID and manager profile, both of which are stored in manager store 252. The manager profile is associated with one or more listings owned or managed by the manager, and includes a number of manager attributes including transaction requests and a set of listing calendars for each of the listings managed by the manager. The manager module 205 provides code for managers to set up and modify their manager profile and listings. A user of the online system 111 can be both a manager and a client. In this case, the user will have a profile entry in both the client store 251 and the manager store 252 and represented by both a client object and manager object. The online system 111 allows a manager to exchange communications, responses to requests for transactions, and transactions with managers.

Any personally identifying information included as part of a client or manager profile, or that is transmitted to carry out a transaction is encrypted for user privacy and protection. For example, upon completion of a transaction by which a manager grants access to an accommodation and the client pays for such access, the transaction information is encrypted and stored as historical transaction information in database 250.

II.B Listings

The listing module 207 comprises program code for managers to list time expiring inventory for booking by clients, and is one means for doing so. The listing module 207 is configured to receive a listing from a manager describing the inventory being offered, a time frame of its availability including one or more of a start date, end date, start time, and an end time, a price, a geographic location, images and description that characterize the inventory, and any other relevant information. For example, for an accommodation online system, a listing includes a type of accommodation (e.g. house, apartment, room, sleeping space, other), a representation of its size (e.g., square footage, or number of rooms), the dates that the accommodation is available, and a price (e.g., per night, week, month, etc.). The listing module 207 allows the user to include additional information about the inventory, such as videos, photographs and other media.

Each listing is represented in the online system by a listing object which includes the listing's information as provided by the manager and a unique listing ID, both of which are stored in the listing store 253. Each listing object is also associated with the manager object for the manager providing the listing.

Regarding geographic location of a listing specifically, the location associated with a listing identifies the complete address, neighborhood, city, and/or country of the offered listing. The listing module 207 is also capable of converting one type of location information (e.g., mailing address) into another type of location information (e.g., country, state, city, and neighborhood) using externally available geographical map information.

Regarding the price of a listing specifically, the price is the amount of money a client needs to pay in order to complete a transaction for the inventory. The price may be specified as an amount of money per day, per week, per day, per month, and/or per season, or other interval of time specified by the manager. Additionally, price may include additional charges such as, for accommodation inventory, cleaning fees, pet fees, service fees, and taxes.

Each listing object has an associated listing calendar. The listing calendar stores the availability of the listing for each time interval in a time period (each of which may be thought of as an independent item of time-expiring inventory), as specified by the manager or determined automatically (e.g., through a calendar import process). That is, a manager accesses the listing calendar for a listing, and manually indicates which time intervals that the listing is available for transaction by a client, which time intervals are blocked as not available by the manager, and which time intervals are already transaction for by a client. In addition, the listing calendar continues to store historical information as to the availability of the listing by identifying which past time intervals were booked by clients, blocked, or available. Further, the listing calendar may include calendar rules, e.g., the minimum and maximum number of nights allowed for the inventory. Information from each listing calendar is stored in the listing table 253.

II.C Search, Requests and Transactions

The search module 209 comprises program code configured to receive an input search query from a client and return a set of time-expiring inventory and/or listings that match the input query, and is one means for performing this function. Search queries are saved as query objects stored by the online system 113 in a query store 254. A query may contains a search location, a desired start time/date, a desired duration, a desired listing type, and a desired price range, and may also include other desired attributes of a listing. A potential client need not provide all the parameters of the query listed above in order to receive results from search module 209. The search module 209 provides a set of time-expiring inventory and/or listings in response to the submitted query that fulfill the parameters of the submitted query. The online system 111 may also allow clients to browse listings without submitting a search query in which case the viewing data recorded will only indicate that a client has viewed the particular listing without any further details from a submitted search query. Upon a client providing an input selecting a time-expiring inventory/listing to more carefully review for a possible transaction, the search module 209 records the selection/viewing data indicating which inventory/listings the client viewed. This information is also stored in the query data store 254.

The transaction module 211 comprises program code configured to enable clients to submit contractual transaction requests (also referred to as formal requests) to transact for time-expiring inventory, and is one means for performing this function. In operation, the transaction module 211 receives a transaction request from a client to transact for an item of time-expiring inventory, such as a particular date range for a listing offered by a particular manager. A transaction request may be a standardized request form that is sent by the client, which may be modified by responses to the request by the manager, either accepting or denying a received request form, such that the agreeable terms are reached between the manager and the client. Modifications to a received request may include, for example, changing the date, price, or time/date range (and thus, effectively, which time-expiring inventory is being transacted for), The standardized forms may require the client to record the start time/date, duration (or end time), or any other details that must be included for an acceptance to be binding without further communication.

The transaction module 211 receives the filled out form from the client and presents the completed request form including the booking parameters to the manager associated with the listing. The manager may accept the request, reject the request, or provide a proposed alternative that modifies one or more of the parameters. If the manager accepts the request (or if the client accepts the proposed alternative), then the transaction module 211 updates an acceptance status associated with the request and the time-expiring inventory to indicate that the request was accepted. The client calendar and the listing calendar are also updated to reflect that the time-expiring inventory has been transacted for a particular time interval. Other modules not specifically described herein then allow the client to complete payment, and for the manager to receive the payment.

The transaction store 254 stores requests made by clients, and is one means for performing this function. Each request is represented by request object. The request may include a timestamp, a requested start time, and a requested duration or a reservation end time. Because the acceptance of a booking by a manager is a contractually binding agreement with the client that the manager will provide the time expiring inventory to the client at the specified times, all of the information that the manager needs to approve such an agreement are included in a request. A manager response to a request is comprised of a value indicating acceptance or denial and a timestamp.

The transaction module 211 may also provide managers and clients with the ability to exchange informal requests to transact. Informal requests are not sufficient to be binding upon the client or manager if accepted, and in terms of content may vary from mere communications and general inquiries regarding the availability of inventory, to requests that fall just short of whatever specific requirements the online system 111 sets forth for a formal transaction request. The transaction module 211 may also store informal requests in the transaction store 254, as both informal and formal requests provide useful information about the demand for time-expiring inventory.

The demand module 213 is described immediately below with respect to FIG. 3.

III. Demand Prediction

III.A Overview

Figure 3A:
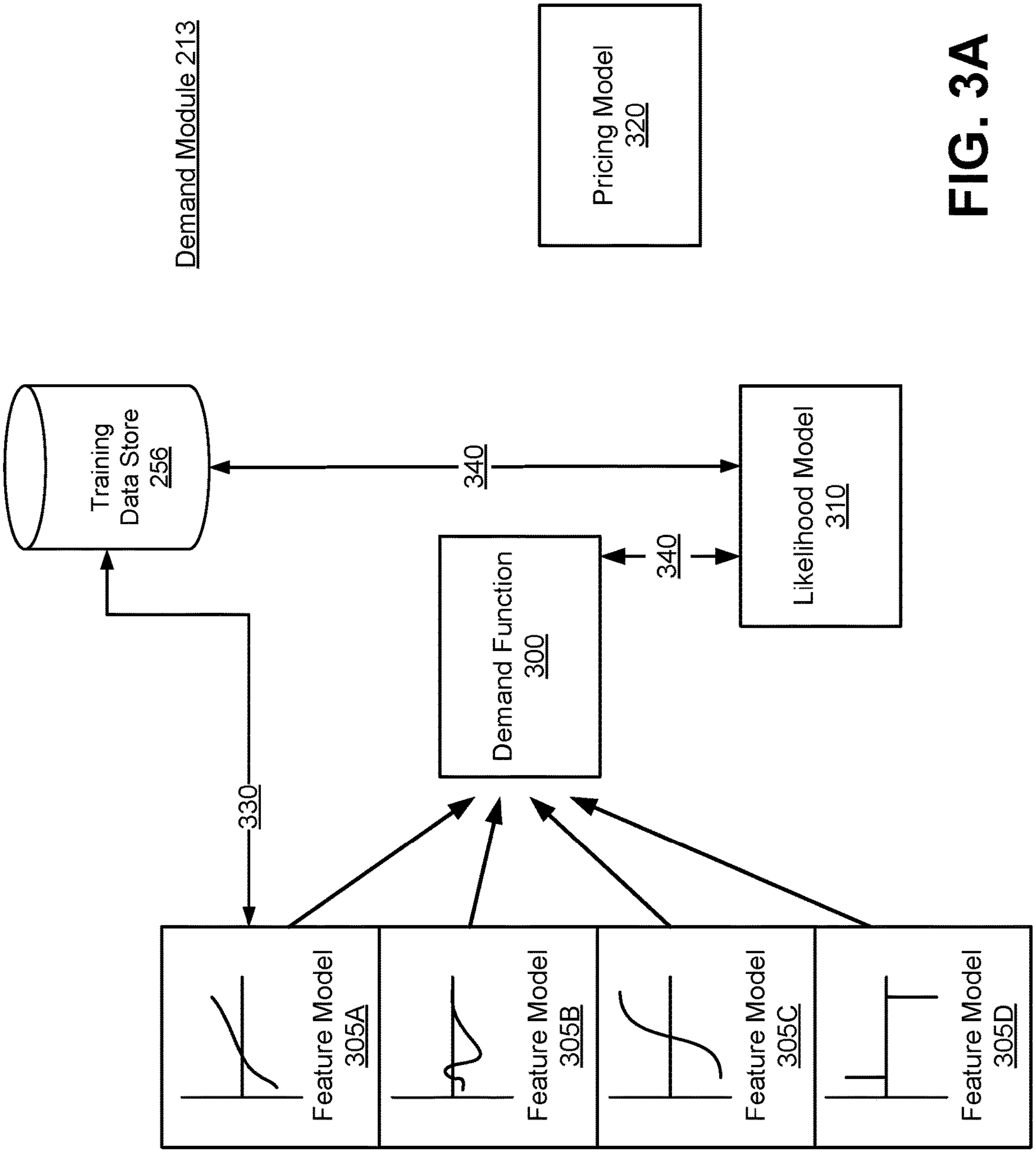
FIGS. 3A-3B are diagrams illustrating the components and operation of the demand module in accordance with one embodiment.

FIG. 3A is a flow diagram illustrating the components and operation of the demand module in accordance with one embodiment. In order to predict demand for a time-expiring inventory in the online system 111, demand module 213 uses a sequence of models and functions including multiple feature models 305, a demand function 300, a likelihood model 310, and a pricing model 320.

The demand module 213 trains the feature models 305 using a set of training data retrieved from the training store 256. The feature models 305 are used as part of a demand function 300 to determine a demand estimate for time-expiring inventory associated with listings in the listing store 223. The demand estimate may in practice be a unit-less numerical value, however the likelihood model 310 can use the demand estimate to determine the likelihood that a given time-expiring inventory will receive a transaction request prior to expiration. The pricing model 320 can make use of likelihoods generated by model 310 to predict the likelihood that time-expiring inventory will receive transaction requests at many different test prices, and therefore provide information about how changes in price (or any other feature from the feature models 305) are expected to shift the likelihood that the time expiring inventory receives a transaction request before expiration.

The demand module 213 operates on data regarding individual time-expiring inventory from associated listings, where listings are represented in the listing store 223 by a number of features. To predict demand, the demand module 213 analyzes many of such inventory in aggregate, and the level of aggregation for demand analysis may vary by implementation. For example. the demand prediction may be system-wide, such that all data across all listings on the online system 111 are analyzed. Alternatively, smaller groupings of the data may be analyzed separately. For example, an online accommodation system may separately analyze the expected demand for all reservation listings in the Chicago metropolitan area, all reservation listings in the state of Kentucky, or all listings within a certain proximity to a national park. These localized estimates of demand are then used to predict demand in those specific locales.

When discussing features, m represents the number of features that describe a listing, individual features are represented as $f_1, f_2, f_3, \ldots, f_m$, and the set of all features for the listing are represented by a feature vector f. The value of any given feature for a given listing may be a numerical value such as an integer, a floating point number, or a binary value, or it may be categorical. Common features include the price of the listing and the remaining time until the inventory expires. For more information about the structure of individual instances of sample training data that are used to train the various functions and models demand module 213, and also to use the demand module 213 to obtain useful information about time-expiring inventory, see section III.C below.

The price feature is the price at which the listing is offered by the manager. For example, in the case of an online accommodation system, the value of the price feature would be the listed price for a client to book an accommodation on a particular day. The manager of a listing may change the price before the expiration time of the listing; therefore, a listing may have had multiple prices before it expires.

The time until expiration feature is defined as the number of time intervals or duration of time before the expiration of the time-expiring inventory. Depending upon the implementation, this may be days hours, minutes, etc. Again using the example of an online accommodation system, the "expiration" of an individual time-expiring inventory would be the day the listing is sought to be booked. For example, a listing to reserve an accommodation on December $20^{th}$ would expire on December $20^{th}$, therefore the value of the time until expiration feature would be the number of days from the current date until December $20^{th}$. In this case, the time interval used is a day because bookings in an online accommodation system are typically made on a daily basis. However, in the case of an online restaurant booking system it might be preferable for the time interval to be an hour because restaurant bookings occur at a higher frequency and over narrower windows of time. The examples herein use days to expiration as an example, but other units (e.g., hours, minutes, etc.) may alternatively be used.

A listing of a time-expiring inventory in online system 111 may have any number of features in addition to the price and time until expiration features. These additional features are dependent on the implementation of the online system 111 and are descriptive of the time-expiring inventory or the listing. For example, in an online accommodation system a listing might have features representing the average client rating for a listed accommodation, the geographical location of the listed accommodation, the number of beds in the listed accommodation, whether the listed accommodation has a wireless router, or any other relevant attributes of the listed accommodation. Additionally, features may include qualities of the listing itself, for example, the number of views the listing has received, the length of the description of the accommodation in the listing, whether a request to book the listing will be reviewed by the manager of the listing before being accepted, or any other qualities of the online listing.

Features may also include features that are relevant to the listing but are not directly related to the individual listing. These features may, for example, provide information about the state of the market for the listings related to a given item of inventory while that inventory was active (i.e., not yet expired or near in time to when it was expired). Examples of such features are the number of searches performed by clients on the online system 111 in the market for other inventory in the same market as the inventory. For example, in the case of an online accommodation system, the feature may be the number of searches for the day for accommodations in the San Francisco Noe Valley neighborhood in relation to an item of inventory located in that neighborhood. Another possible feature might be a binary feature indicating whether a noteworthy event (e.g., the Super Bowl) is occurring in sufficient proximity in time and geographic location to the inventory.

Additionally, a feature may describe an interaction between multiple other features or be derivative of other features. For example, the average price may be calculated for a listing between the time it was booked and the time it was listed. Alternatively, a feature might include a correlation value between the value of two other features.

The demand function 300 may be any function or statistical model that uses the feature values of listings to produce a demand estimate. In one implementation the demand function is a generalized additive model that is created by fitting the feature models for the features together to determine the contribution of that feature to the demand estimate. A demand function 300 using a generalized additive model is of the form: $D(f)=w_1(f_1)+w_2(f_2)+ \ldots +w_m(f_m)$. Where D(f) is the demand function 300 and is also the output demand estimate, and $w_1, w_2, \ldots, w_m$ are the weight functions of each of the feature models 305 that determine the contribution of each feature value $f_1, f_2, \ldots, f_m$ respectively to D(f). The fitting of the generalized additive model may be completed using a number of fitting algorithms including stochastic gradient descent, kd-trees, Bayes, or a backfitting algorithm. These algorithms are used to iteratively fit the feature models 305 in order to reduce some loss function of the partial residuals between the feature models 305 and the labels on the training data of prior time-expiring inventory.

A feature model 305 may be any non-parametric statistical model relating a feature value to a weight indicative of the effect of the feature on the likelihood of the time-expiring inventory receiving a transaction request before expiration, which is related to the demand estimate D(f). Depending on the characteristics of each feature, a different statistical model may be fitted to each feature based on training data regarding possible values for that feature. For example, B-splines, cubic splines, linear fits, bivariate plane fits, piecewise constant functions, etc. may all be used. To define the features themselves, both supervised and unsupervised machine learning techniques may be used to determine the features at the outset prior to training of the generalized additive model. In the case of supervised learning techniques, the training may be based on some other signal other than the label of the training data, as that is instead used to train the generalized additive model.

A positive label is assigned to a prior time-expiring inventory (herein referred to as a training time-expiring inventory) that received a transaction request from a client before expiration, and a negative label is assigned to a training time-expiring inventory that expired without receiving a transaction request. Further discussion of training data structure and training of feature models 305 is provided in sections III.C and III.D, respectively, and with reference to FIGS. 4A-7B.

Returning to the demand estimate D(f), the demand estimate is a unit-less measure that is not actionable without verification using the training data. For example, a value for $D(f_A)$ for a particular feature vector $f_A$ might be 0.735. This information alone is not helpful without determining which values of the demand function 300 correspond with a likelihood of receiving a transaction request for a time-expiring inventory from a client before its expiration. The likelihood model 310 is a statistical model that solves this problem by mapping demand estimates, D(f), to the likelihood of receiving a transaction request, P(D(f)), given a listing with feature vector f. The likelihood model 310 is trained by using the same positive and negative training labels for each feature vector f used to estimate a demand D(f). Further discussion of the likelihood model 310 is described in section III.E with reference to FIG. 8.

The pricing model 320 models the likelihood of receiving a transaction request for a listing at a variety of test prices around the listing's current price (or any other arbitrarily chosen pivot price on request). The demand module 213 uses an iterative process to generate the pricing model 320 that generates test data surrounding an initial data point representing the likelihood of receiving a transaction request at the listing's pivot price. This process is outlined in section III. B below and is further described in section III. F with reference to FIG. 9.

III.B Example Process Flow

FIG. 3A illustrates the process flow for training the demand function 300 and likelihood model 310 for a time expiring inventory according to the arrows between each of the models, functions and data stores in the figure. The demand module 213 trains 330 the feature models 305 using the training data from training store 256. The demand module 213 then evaluates the demand function 300 for each feature vector of each sample in the training data and trains 340 the likelihood model 310 based on the label for each feature vector in each sample.

Figure 3B:
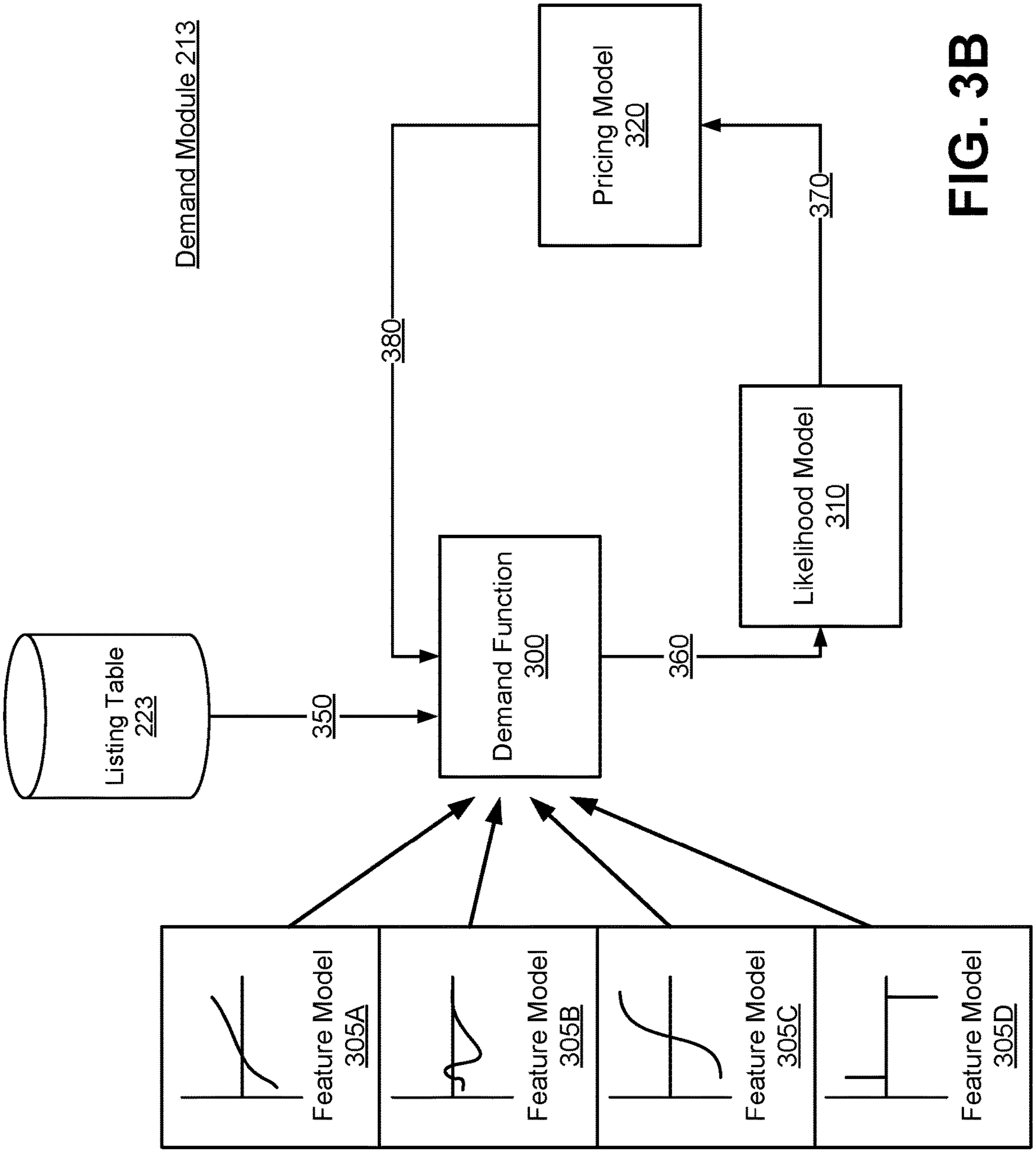

FIG. 3B illustrates the process of pricing a listing after the demand module 213 has trained the demand function 300 and the likelihood model 310. Upon receiving instructions from the online system 111 to predict the demand for a subject listing, the demand module 213 retrieves 350 the feature vector corresponding to the subject listing, $f_s$, from the listing table 223 and uses it as an input to the demand function 300. The demand module 213 then sends 360 the resulting demand estimate, $D(f_s)$, to the likelihood model 310 for conversion to a likelihood of receiving a transaction request prior to expiration. The demand module 213 may then transfer 370 the resulting likelihood, $P(D(f_s))$, to the pricing model 320 for use in modeling how changes in the pricing of a listing may alter demand for the listing.

To generate the pricing model 320, the demand module 213 then modifies 380 the value of the price feature in the feature vector $f_s$ by incrementing the price feature by a price interval in both the positive and negative directions creating test prices at each of a set of test times to expiration, thereby creating modified feature vectors $f_s^{(1)}$ and $f_s^{(-1)}$, which contain price feature value equal to each of the test prices and a time to expiration feature value equal to each of the test times to expiration. In the modified feature vectors, all other features values other than price and time to expiration are left unmodified. The likelihoods of receiving a transaction request for each of the new feature vectors, $P(D(f_s^{(1)})$ and $P(D(f_s^{(-1)})$, are then calculated by the demand function 300 and the likelihood model 310 and grouped with the original likelihood for the listing $P(D(f_s))$. The demand module 213 then continues incrementing the price feature by the price interval and the time to expiration feature by the time interval to create additional test prices and test times to expiration for feature vectors $f_s^{(2)}$ and $f_s^{(-2)}$ and the process is repeated until enough data points are created.

Upon reaching a threshold number of pricing and time to expiration points, the demand module 213 processes the test prices and test times to expiration and corresponding likelihoods of receiving a transaction request to identify a price that meets a goal of the manager or requester of the information. In one embodiment, this is accomplished by fitting the test price, test time to expiration, and likelihoods with a trained regression tree, which takes an input (1) lead time to expiration, (2) day of week, and/or (3) price and generates an output likelihood of utilization. The fit function may be used to identify a new price for how to price a listing and/or achieve a certain likelihood of booking. More generally, the ability of the demand module 213 to generate a likelihood estimate based on demand provides information to the manager of the time-expiring inventory that the manager may take into account when selecting a price for the time-expiring inventory.

III.C Training Data Labels

Figure 4A:
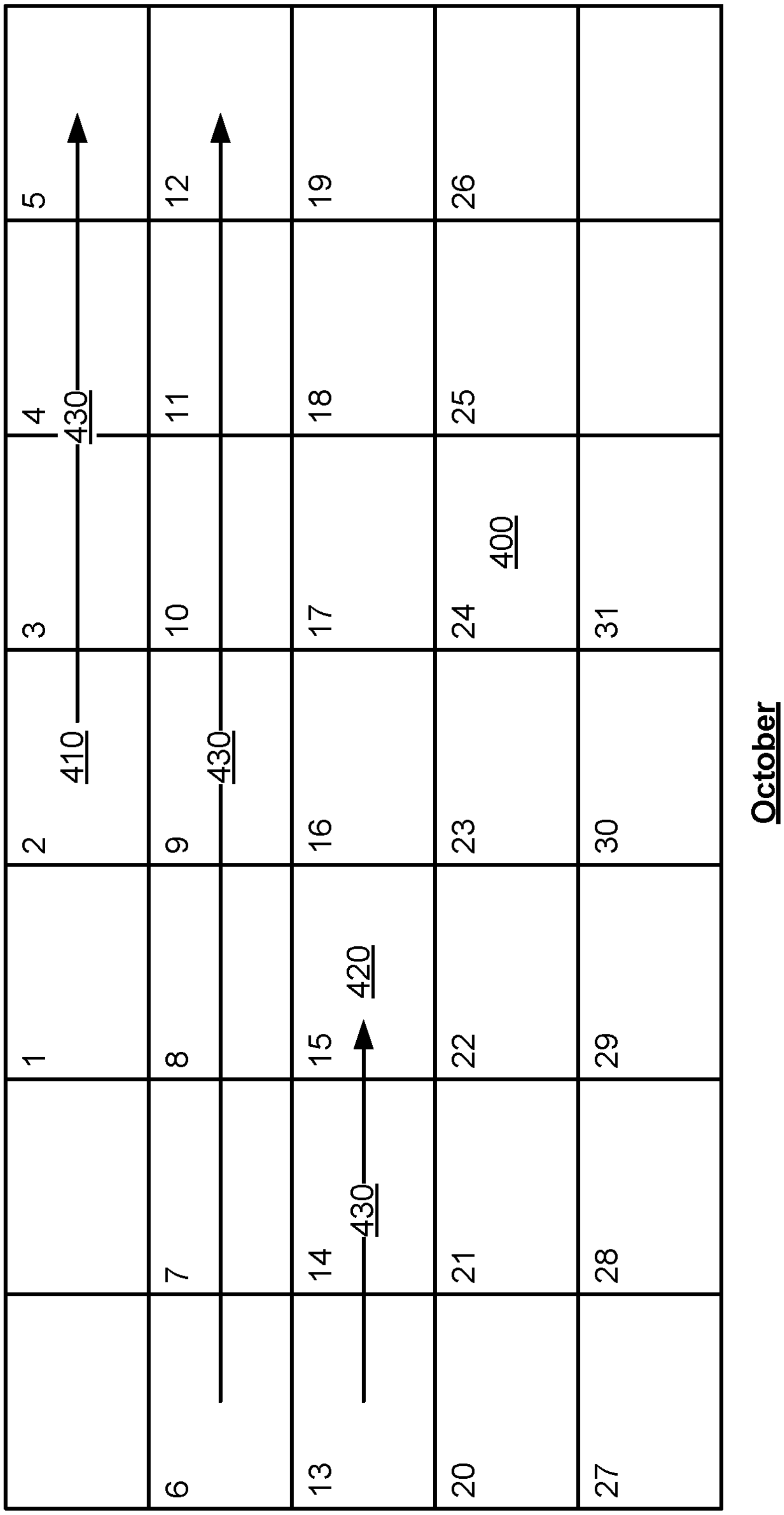
FIGS. 4A-4D illustrate labeling logic for training data used by the demand module in accordance with one embodiment.

FIGS. 4A-4D illustrate the labeling logic for training data used by the demand module in accordance with one embodiment. In FIG. 4A a listing calendar is displayed having a time interval of one day. This means that a listing is only offered for booking by a client on a daily basis (though a client may request booking of a listing on multiple adjacent days). FIG. 4A illustrates how training data is sampled from historical booking data, which may be retrieved from the transaction store 255 and separately transferred to store 256 for use as training data. The timeline illustrated in FIG. 4A represents data taken from a single listing. The listing has an expiration time (or expiration date) 400 of October $24^{th}$, an initial listing time (or initial listing date) 410 of October $2^{nd}$, and a request received and accepted time (or date) of October $15^{th}$.

The expiration time 400 of a listing is the time at which the time-expiring inventory is no longer available or presented to the client by the online system 111. In online reservation systems, the expiration time 400 is typically the time at which the reservation would begin.

The initial listing time 410 is the time at which the listing is first made available to clients and/or the first day that the listing was provided to the online system 111 by the manager.

The request received and accepted time 420 is the time at which a transaction request from a client has been both received and (formally) accepted by the manager, generally making the transaction contractually binding on both parties.

In the example of FIG. 4A, separate samples of training data are recorded 430 in the training store 256 for each day between the initial listing date 410 and the request received and accepted date 420. Each sample is comprised of a feature vector f for the listing on the day it was recorded. Labels for the samples are not applied until the final outcome of the listing is known. In the example of FIG. 4A, the samples for each of October 2nd through October 15th are given positive labels corresponding to an accepted request because the eventual outcome of the listing was a request and a subsequent acceptance of that request on the request received and accepted date 420.

In some embodiments, no samples are collected for the days between 420 and the expiration date 400 as the listing has already been accepted and is no longer being presented to clients on the online system 111. This may occur, for example, if the time-expiring inventory is unique. When a time expiring inventory is not unique (e.g., multiple approximately identical seats on a flight) the system may allow the listing to persist, and thus more data may be collected, during the time until the time expiring inventory is exhausted or expires. In some embodiments, the system defines multiple listings that share the same price and treats each non-unique listing as a unique listing which has a number of identical features. Bookings of a member of the group of listings are applied to one of the listings in the group and the rest of the listings are allowed to persist.

Recording a sample of training data for each time interval while the listing is available vastly increases the number of data points available to the demand module 213 for analysis when compared to collecting only one data point for each accepted transaction request in aggregate over the total period of availability.

Figure 4B:
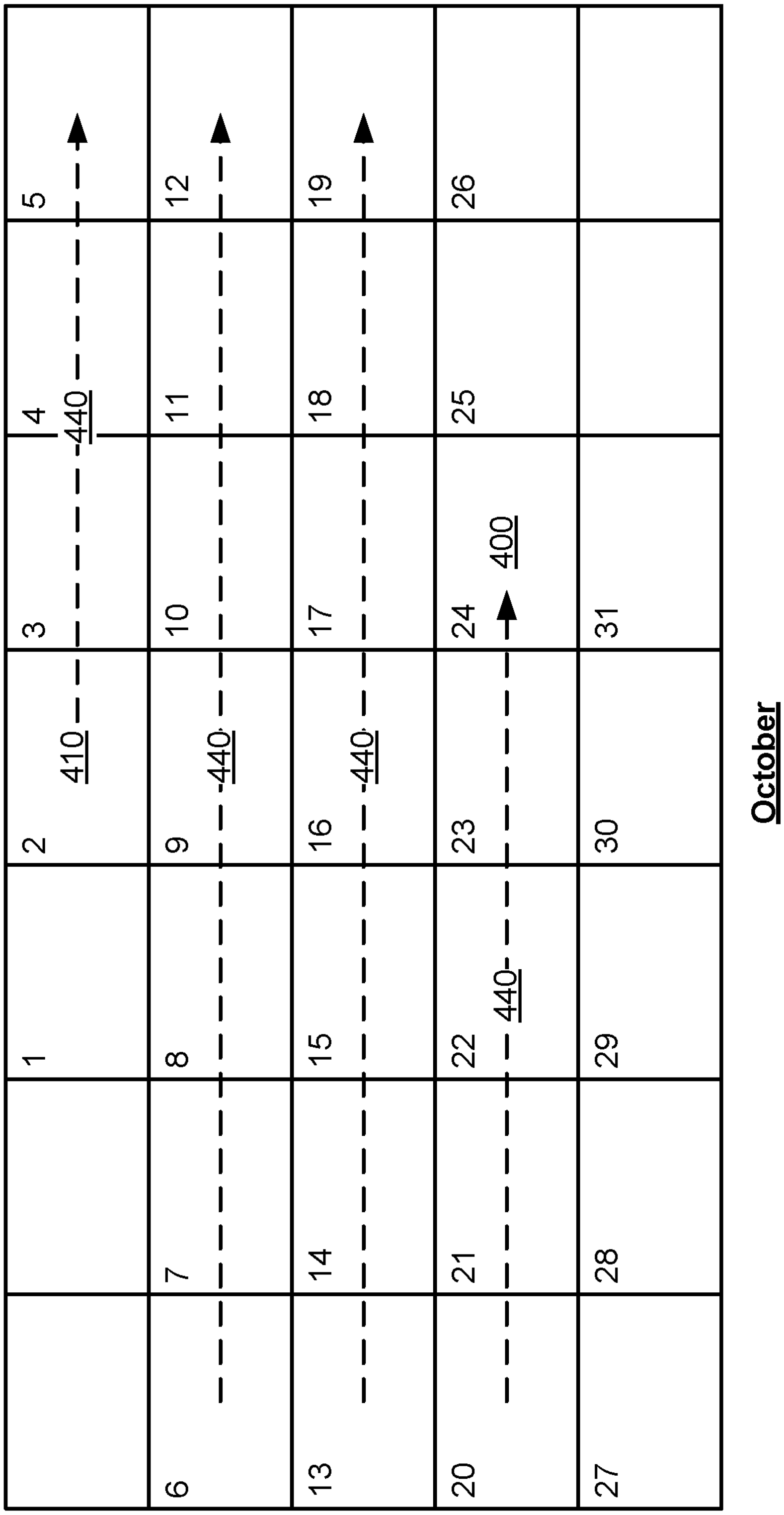

FIG. 4B illustrates a second example outcome for labeling samples of training data from a historical booking data. In the case illustrated in FIG. 4B the expiration date 400 and the initial listing date are the same as in FIG. 4A. However, in FIG. 4B no transaction requests were received for the listing even though the listing was available from the initial listing date 410 to the expiration date 400. As a result, all samples 440 obtained for the days that the listing was available are labelled with a negative training label indicating that a transaction request for the listing was not received before the time-expiring inventory expired.

Obtaining samples of training data for listings that have both received transaction request and also which have not received transaction requests and labeling them differently further increases the amount of data available to the demand module 213 when compared to models that only take into account those listings that received transaction requests.

Figure 4C:
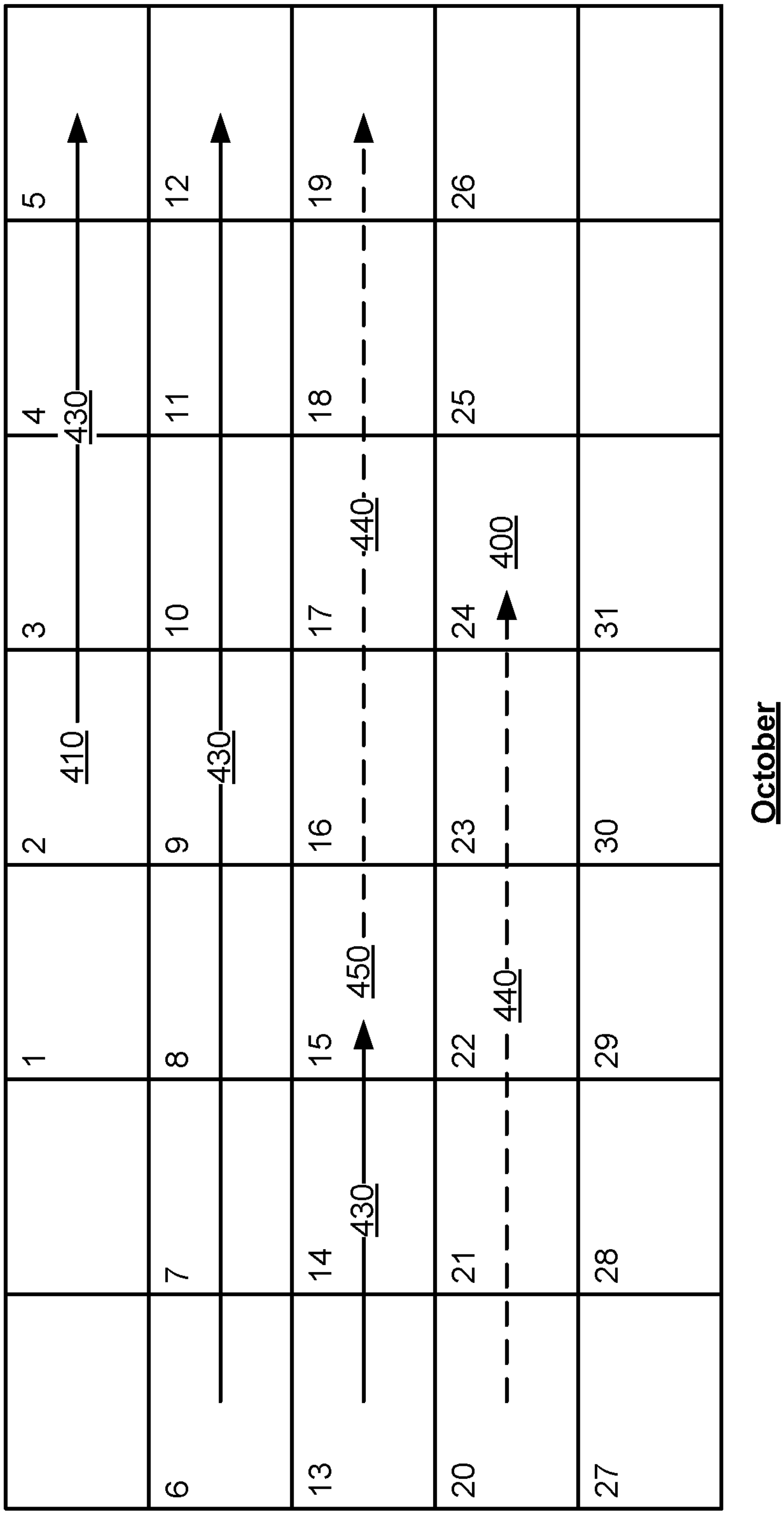

FIG. 4C illustrates a third more complicated example outcome for obtaining and labeling samples of training data from historical booking data. In FIG. 4C, the expiration date 400 and the initial listing date 410 are the same as in the two previous examples. However, in FIG. 4C the manager of the listing receives a transaction request on October $15^{th}$ but subsequently denies the request 450. This leaves the listing available to receive further transaction requests. No further transaction requests are received between the request denial date 450 and the expiration date.

In this situation, positive labels are applied 430 to samples for dates before the transaction request for the listing was received and subsequently rejected 450 as the request could have resulted in a successful transaction if the manager had accepted. Because the listing received no further transaction requests after the request denial date 450, samples for dates after the first request is labeled with a negative label 440, as the lack of transaction requests received during that period of time is independent of transaction requests received earlier in time, thus the features of the listing during that time period were unable to generate the demand sufficient to attract a transaction request. In some embodiments, the request denial date 450 may be the date that the denied transaction request was received. In other embodiments, the request denial date 450 is the date that the transaction request was denied. Alternatively (not shown) if a second transaction request is received after the first request was denied 450 the remaining samples would instead be labeled with a positive label.

Figure 4D:
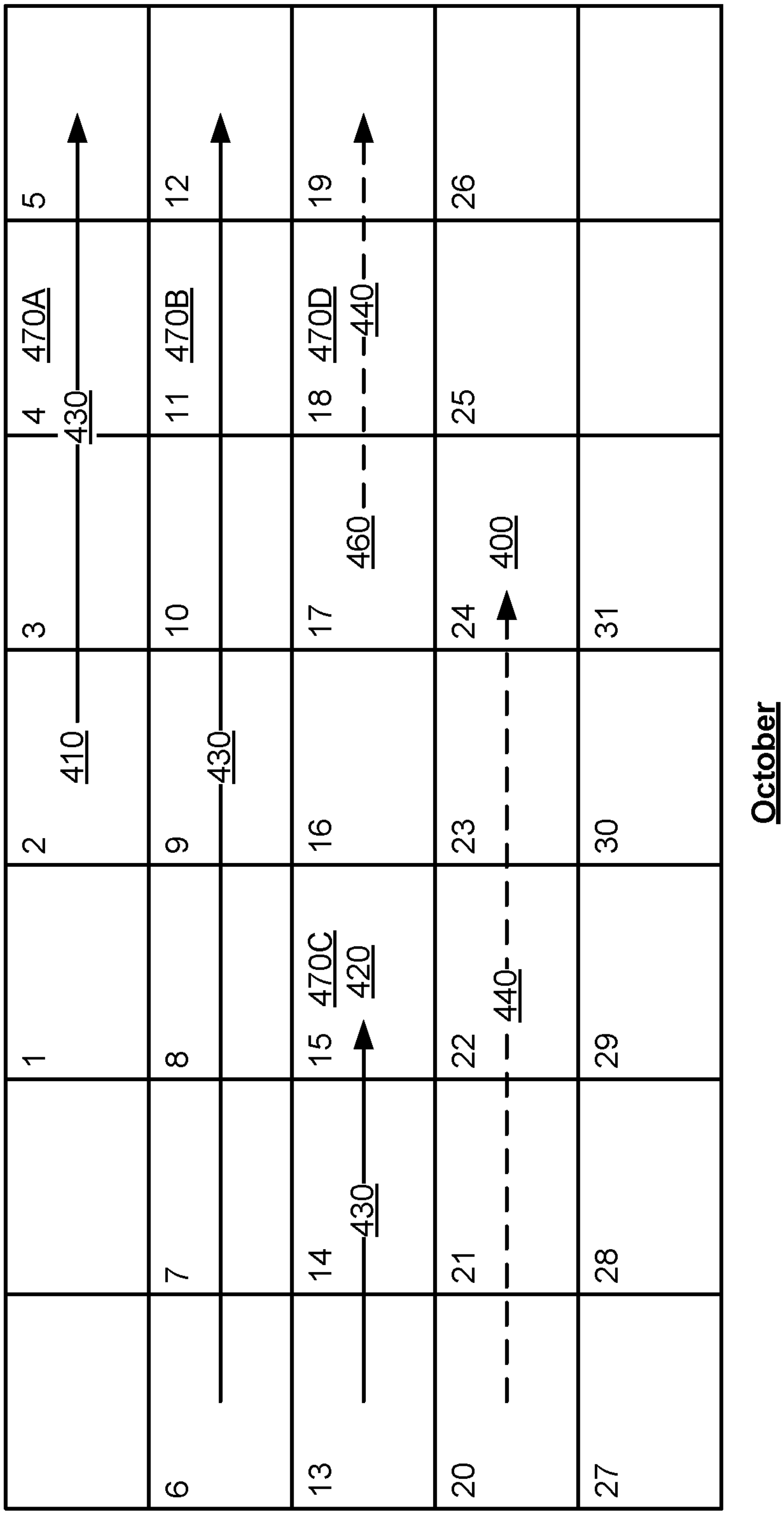

FIG. 4D illustrates a fourth example outcome for obtaining and labeling samples of training data from historical booking data. In FIG. 4D, the expiration date 400 and the initial listing date 410 are again the same as in previous examples. As in FIG. 4A, a transaction request is received and accepted 420 on October $15^{th}$, however in FIG. 4D the client that requested the listing cancels the transaction request allowing the listing to again be accessible to other clients on the online system 111. After being cancelled, the listing receives no further transaction requests. In a similar situation to FIG. 4C, the samples for dates from the initial listing date 410 to the transaction request acceptance date 420 are labelled 430 with a positive label and, after the listing is made available to clients on the cancellation date 460, the training data is labelled 440 with a negative label. In this case, the day in between the cancellation date 460 and the transaction request acceptance date 420 no samples are generated since the listing is not available to clients during that time. Again (not shown), if the listing had received a transaction request after cancellation date 460 the samples after the cancellation date would instead receive a positive label.

As above, individual training data samples are obtained on each date indicated by time periods 430 and 440, however samples 470A-470D are specifically labelled for use in the following discussion with reference to FIG. 5.

FIG. 5 illustrates example tables for storing the training data used by the demand module 213 in accordance with one embodiment. FIG. 5 displays two example tables for stored samples of training data table 500 and table 510. Table 500 is a general example indicating the variety of features that may be included in a feature vector, while table 510 is a specific example of samples 470 from a single listing that may be used in an accommodation system.

In table 500, each row represents a single sample of training data recorded for a particular day from historical booking data. Each row contains the feature value of each feature in the feature vector ($f_1$ through $f_m$) and a training label that corresponds to the final outcome of the listing from which the training sample was recorded (as described with reference to FIG. 4A-4D). In this embodiment, a training label of 1 is used to represent that a transaction request was received for the listing and a training label of −1 is used to represent a situation in which no transaction request was received before the time-expiring inventory expired.

The columns of table 500 illustrate a number of example feature types: features 1 and 2 are quantitative, feature 3 is categorical, and feature m is binary. Table 500 contains m+1 columns (some of which are edited out for illustrative purposes) correspond to m features and the training label for each feature vector. Table 500 contains N rows corresponding to the total number of training data samples N.

Table 510 illustrates a selection of data sample from an example listing timeline illustrated in FIG. 4D. Though samples would be recorded for each day from the initial listing date 410 until the request acceptance data and again from the cancellation date 460 to the expiration date 400, only samples 470A-470D are shown in the table for discussion purposes and ease of illustration.

In table 510, the columns are labeled with example features for an online accommodation system listing including price, days until expiration, city of the listed accommodation, and whether the listed accommodation includes a wireless router (Wi-Fi). Because samples 470A-470D are all from the same listing the city feature and the Wi-Fi feature remain the same over all samples, while the days until expiration feature and the price feature change over the sampling period.

Sample 470A was recorded before the transaction request was received and accepted 420 thus a training label of 1 is applied. Sample 470A was recorded on October $4^{th}$, 20 days before the expiration date 400, thus the days until expiration feature has a value of 20. In this example, the price of the listing on October $4^{th}$ was $120, thus the price feature has a value of 120. In sample 470B, the manager has reduced the price to $100 and a week has passed since sample 470A was recorded. Therefore, the values for the days until expiration feature and the price feature have changed to reflect the changes in the listing features. The price of $100 remains constant in the days between the sample 470B and sample 470C. Sample 470C was recorded on the request received and accepted date 420, indicating that the price at which the request was received was $100. Note that this price differs from the original price of $120 for sample 470A.

This difference in prices (and potentially other features) introduces a causality issue because it is unknown whether lowering the price was the causal factor in inducing a client to submit a transaction request for the listing. For example, if a transaction request would not been received at a price of $120 but was later received when the price was lowered to $80, the training label of 1 for the training data sample for dates where the price was $120 would indicate a positive result for feature values (e.g., price $120) that may not have caused the receipt of a transaction request if the price had remained at $120 until expiration.

The demand module 213 may handle these types of causalities differently depending on the embodiment. In some embodiments, a sample is thrown out if it differs substantially (based on number of differing features between samples, a maximum difference threshold, or another metric) from the sample recorded on the receipt date 420 of the transaction request. In another embodiment, a sample is given less weight based on how much it differs from the sample recorded on the request received date (for example a label of 0.5 may be given). In yet another embodiment, additional features such as a "days until request" or a "price at which the client request was received" feature may be added to the feature vector to reflect differences in sample contributions to the demand function 300. In some cases, these samples with differing features are given full weight for the purpose of simplifying the data labeling process or because they are assumed to have a minimal effect on the demand prediction model. In another embodiment, the average, median, or other measure of the distribution of prices between the initial listing date 410 and the request received date 420 is a separate feature.

III.D Feature Models

Figure 6:
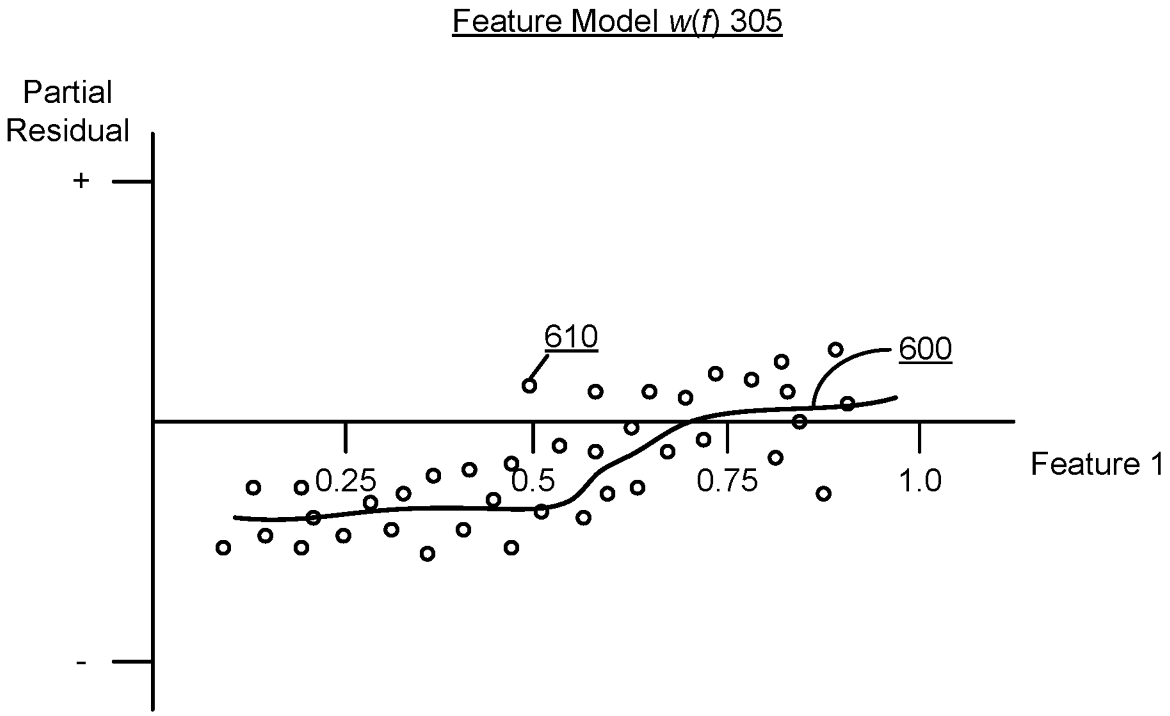
FIG. 6 illustrates a feature model in accordance with one embodiment.

FIG. 6 illustrates a feature model w(f) in accordance with one embodiment. FIG. 6 displays a feature model 305 relating the value of feature 1 to a weight in the demand function 300. A statistical model 600 is fit to the training data points 610, which are the partial residuals between the demand model 300 output D(f) and the corresponding feature value f for an individual sample. Each iteration of the training process changes the residuals and the statistical model 600 is fitted to the data. The algorithms, such as stochastic gradient descent and the backfitting algorithm seek to minimize the partial residuals between the statistical models 600 for all features in the demand model 300. Upon iterating through the training data set the statistical models 600 converge to the feature models 305 that output a weight for each given feature value. Many statistical methods may be used to fit the data including B-Splines, cubic splines, any type of regression, Dirac delta functions (for categorical and binary data), or any combinations of these methods. Administrators of the online system 111 may configure the feature models 305 in order to best represent the data. After fitting, feature models 305 will have weight values between −1 and 1 for full range of feature values. In some embodiments, the feature values are normalized to restrict the range to between 0 and 1. If the feature is categorical or binary the statistical model 600 may simply be a mapping from the feature category to a weight value, or based on a transformation of the categorical data into a scale designed for use in determining the weight.

Figure 7A:
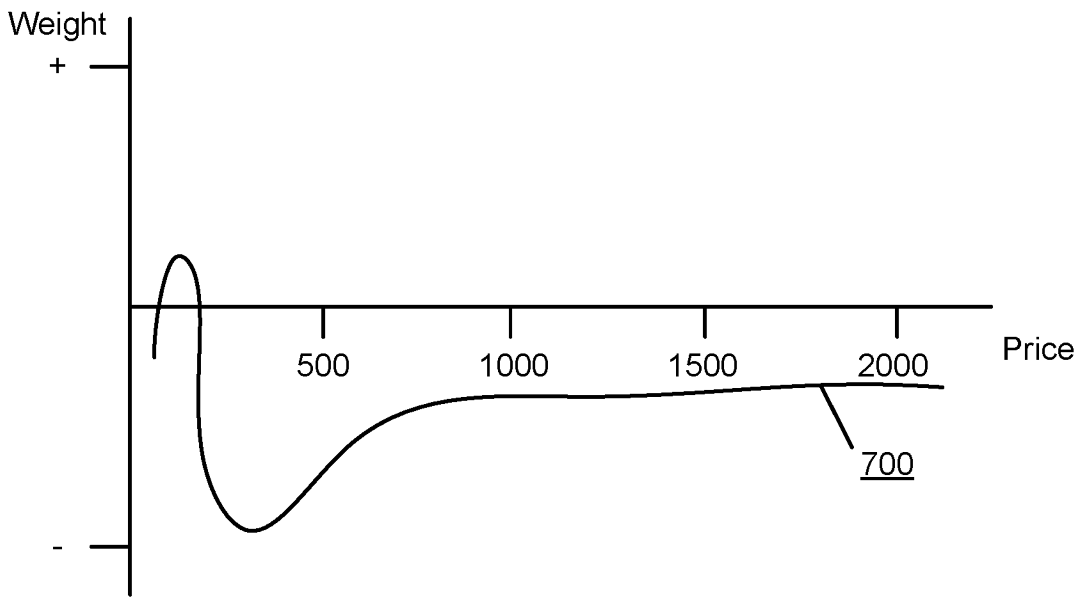
FIGS. 7A-7B illustrate example feature models in accordance with one embodiment.
Figure 7B:
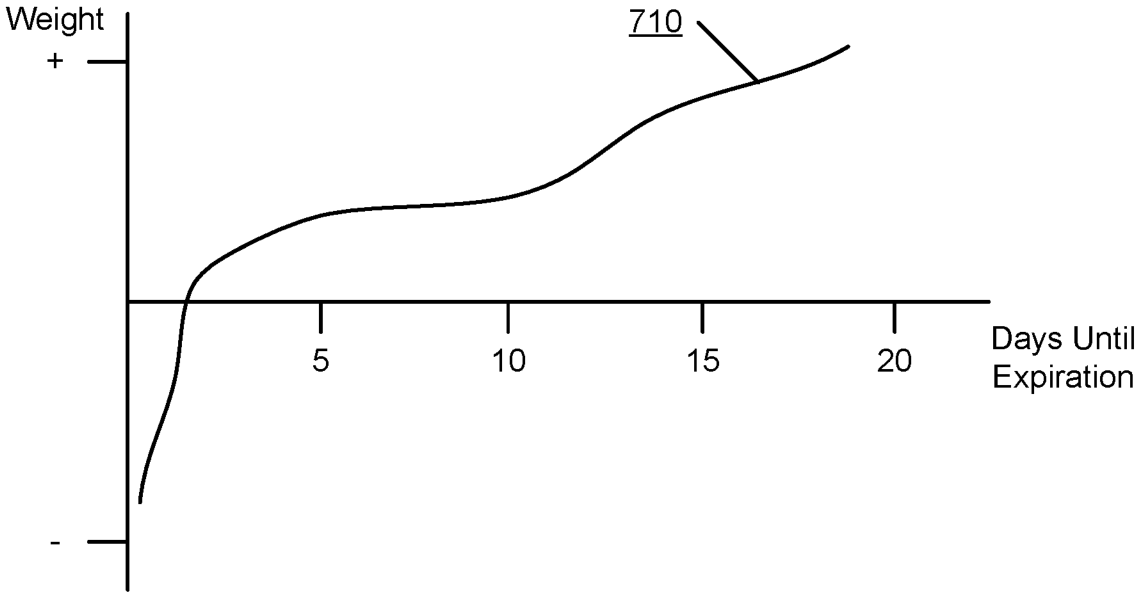

FIGS. 7A-7B illustrate example feature models 305 in accordance with one embodiment. FIG. 7A illustrates an example of what a feature model 305 for a price feature might be with a typical set of training data. In this case, the statistical model 700 is typical of a spline fit for price data. Based on the statistical model, the price has a negative effect on demand for very cheap listings (possibly because clients are concerned about being scammed), at cheap but reasonable price levels the price has a positive effect on the demand for a listing. As the price increases, the effect on demand becomes increasingly negative until a certain point where clients at that price level have more elastic spending habits and the price feature has a less negative effect on the demand.

FIG. 7B illustrates what a typical feature model 305 for a "days before expiration" feature with a typical set of training data. The statistical model 710 used in this case indicates that the earlier a listing is posted before its expiration date the more likely demand will be high for that listing. Either of these example feature models 305 may vary from typical results and are used herein only as examples to illustrate the functionality of a feature model 305 in the context of the online system 111.

III.E Likelihood Model

Figure 8:
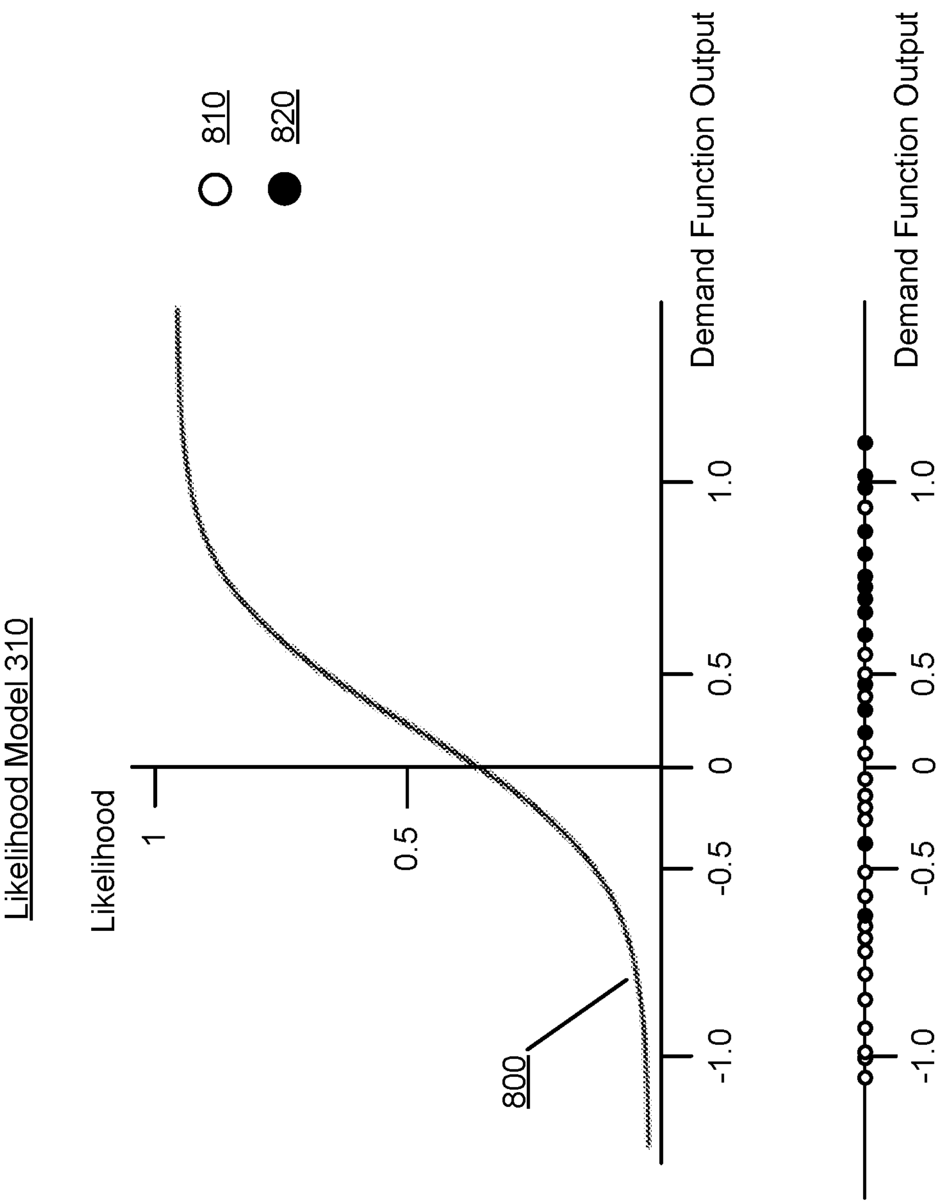
FIG. 8 illustrates a likelihood model used by the demand module in accordance with one embodiment.

FIG. 8 illustrates a likelihood model 310 used by the demand module 213 in accordance with one embodiment. Once the demand module 213 has trained the feature models 305, the demand module 213 may use a set of feature vectors f for a number of samples of training data, and output an estimated demand D(f) for each of the samples using the demand function 300. To train the likelihood model 310, the demand module 213 fits a likelihood function 800 to the labeled values for the estimated demands D(f). The likelihood function 800 is a function that solves the binary classification problem of determining the likelihood that a feature vector f has a positive label given D(f), otherwise stated as the likelihood a given sample received a transaction request before expiration of the time-expiring inventory. In FIG. 8, negative labels are represented with a white circle 810 while positive labels are represented by a black circle 820. The likelihood function 800 approximates the likelihood of a dot being black based on the estimated demands for the samples.

In some embodiments, a Platt scaling algorithm is used as the likelihood function 800. The Platt scaling algorithm applied to the demand function would be of the form:

$$P(D(f))=(1+\exp(\alpha D(f)+\beta))^{-1}$$

Where $\alpha$ and $\beta$ are learned constants. A loss function, such as a Hinge-loss function or another similar technique, is used to train the Platt scaling algorithm using the maximum likelihood method so that it best solves this binary classification problem.

Once the demand module 213 has trained the likelihood function 800, the likelihood module 310 can receive as input an estimated demand D(f), and output a likelihood that a time-expiring inventory will receive a transaction request before expiration P(D(f)).

III.F Pricing Model

Figure 9A:
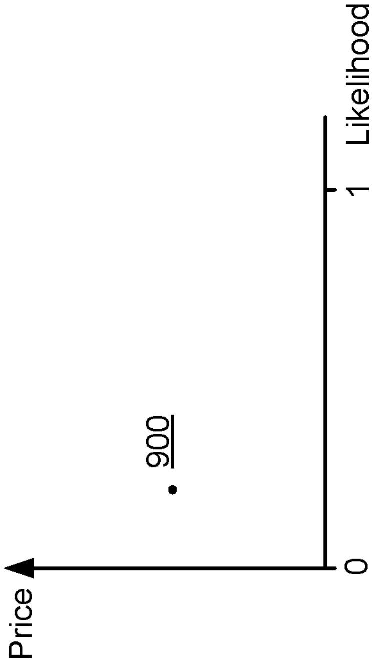
FIGS. 9A-9C illustrates a process of creating a pricing model for a listing.
Figure 9B:
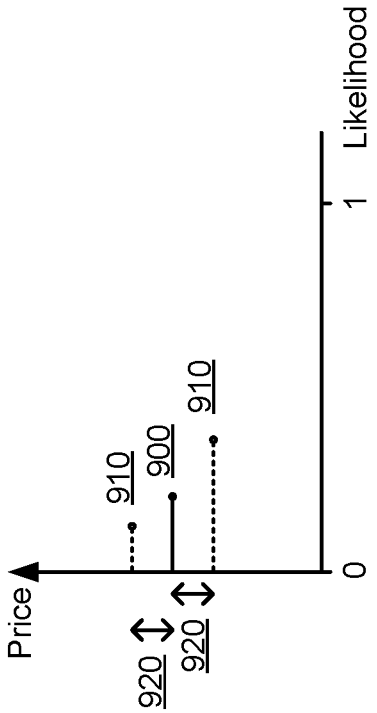
Figure 9C:
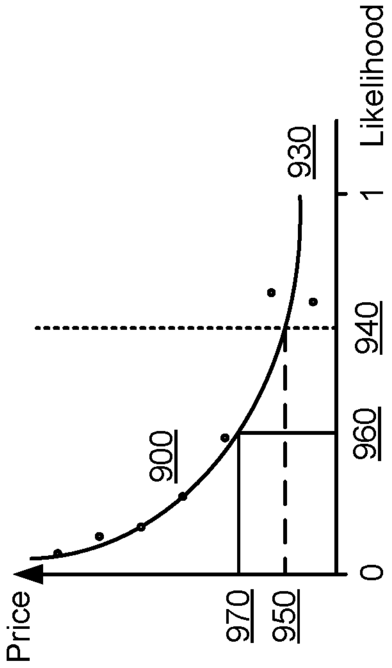

FIGS. 9A-9C illustrate a process of creating a pricing model 320 for a listing. After both the demand model 300 (including feature models 305) and the likelihood model 310 (including likelihood function 800) have been trained using the samples of training data, the demand module 213 has the capability to convert any feature vector f to a likelihood of receiving a transaction request P(D(f)).

To provide the likelihood of receiving a transaction request within a range of test prices, the demand module 213 creates modified feature vectors with price feature values equal to a set of test prices (including the pivot price of the listing) and the values of the remaining features remaining unchanged. The demand module 213 then determines test demand estimate and corresponding test likelihood of receiving a transaction request for each modified feature vector.

The demand module 213 then processes the test prices and corresponding test likelihoods of receiving a transaction request to identify a price that meets a goal of the manager or requester of the information. This may be accomplished by fitting the test price and likelihood data points. For example, a model may be fit to the test price and likelihood data points to create a smooth monotonically decreasing pricing model 320. This process is illustrated in FIGS. 9A-9B.

In FIG. 9A the value of the price feature and the likelihood of receiving a transaction request for a time-expiring inventory is plotted. Data point 900 represents the current likelihood of the subject listing receiving a transaction request at its pivot price (e.g., the current price). The demand module 213 then creates test data points 910 by incrementing the value of the price feature by price interval 920 positively and/or negatively. Price interval 920 may be an amount or a proportion of the original value of the price feature for the subject listing. In some examples, there are different positive and negative price intervals.

The demand module 213 continues to increment the value of the price feature by the price interval in either direction of the original price. This process continues until a threshold range of test prices are covered or a threshold number of data points are generated. These test prices may, for example, be as high/low as twice/half the current price or higher/lower. Once enough test prices have been generated the data points are fit with price function 930 as illustrated in FIG. 9C. Any function may be used to fit the generated price versus likelihood data. The price function 930 may be a Weibull distribution.

Upon fitting the price function 930 to the test prices and resulting generated likelihoods, the demand module 213 may present the price function 930 to the manager to aid in setting prices for the subject listing. Alternatively, the demand module 213 may provide price tips to the manager. In one example, price tips may be based on a threshold likelihood (the maximum price that results in the threshold likelihood of receiving a transaction request). For example, if the threshold likelihood was set at likelihood 940 the resulting price suggestion would be price 950. In other examples, the price may be chosen to maximize the value of the price times the likelihood. For example, if price 970 times likelihood 960 is a maximum for the price function 930 then price 970 may be the price suggestion for the user.

In some examples, a revenue function is learned to determine a relationship between price and the likelihood of receiving a transaction request that results in better price tips. For example, the revenue function may be $R(p_s,P(D(f_s)))=p_s^a \cdot P(D(f_s))^b$ (where $p_s$ is the hypothetical price of the subject listing) for the price function 930 based on learned constants a and b. In this case, the training data for this revenue function would be previous price predictions and the corresponding likelihood values for those price predictions for various listings. In addition, other metrics may be used to provide as price tips to the user.

III.G. Regression-Tree Compressed Feature Vector Machine Model

As described above, FIGS. 9A-9C illustrate a process of creating a price curve and pricing model 320 for a listing. Alternatively, the systems described may use a per-listing regression tree to generate a generalized model and price curve for a listing. The system uses the likelihood model (e.g., for every listing and number of days until expiration) at a number (N) of prices (for example 10% to 200% of the current price) at a number ($E_T$) of times until expiration (for example 1 to 60 days to expiration of the listing) to calculate a likelihood of receiving a transaction request at each price and each time until expiration. Then the system takes each of the generated data points (N by $E_T$ data points) and trains the regression tree to "compress" the N by $E_T$ data points into a generalized model. For example, if the system uses a range of 120 nights at 10 prices per night, the system uses 1200 (10 prices: night by 120 nights) data points to train the regression tree to create a generalized model. This approach has at least two advantages over the previously-described pricing model. First, it produces a single model for each listing across all nights as opposed to multiple independent, per-night curves. Accordingly, there is greater potential for extrapolation with the regression-tree compressed price curve over arbitrarily long lead times, or times to expiration. Second, as shown through experimental results described below, the regression-tree compressed curve more faithfully reproduces the raw price and likelihood mappings.

To implement the regression trees, the demand module 213 may train per-listing regression trees that map (1) lead time to expiration, (2) day of week, and/or (3) price to the likelihood of receiving a transaction request. The demand module 213 may also use a calibrated likelihood that is the result of a normalized machine learning model output to reflect real world booking probability. In one example, the likelihood is calibrated using a logit function. A logit transformation may be chosen for the label to help separate out the very low likelihoods that may occur in undesirable and/or poorly priced listings. In one embodiment, the model includes at most 9 levels and at least 2 leaves per branch. Alternate embodiments reduce the max depth to 7 or 8 to save space. Other embodiments may have other numbers of levels or leaves per branch. The models are stored in the training store 256 for use in determining price tips for a given listing.

Figure 10:
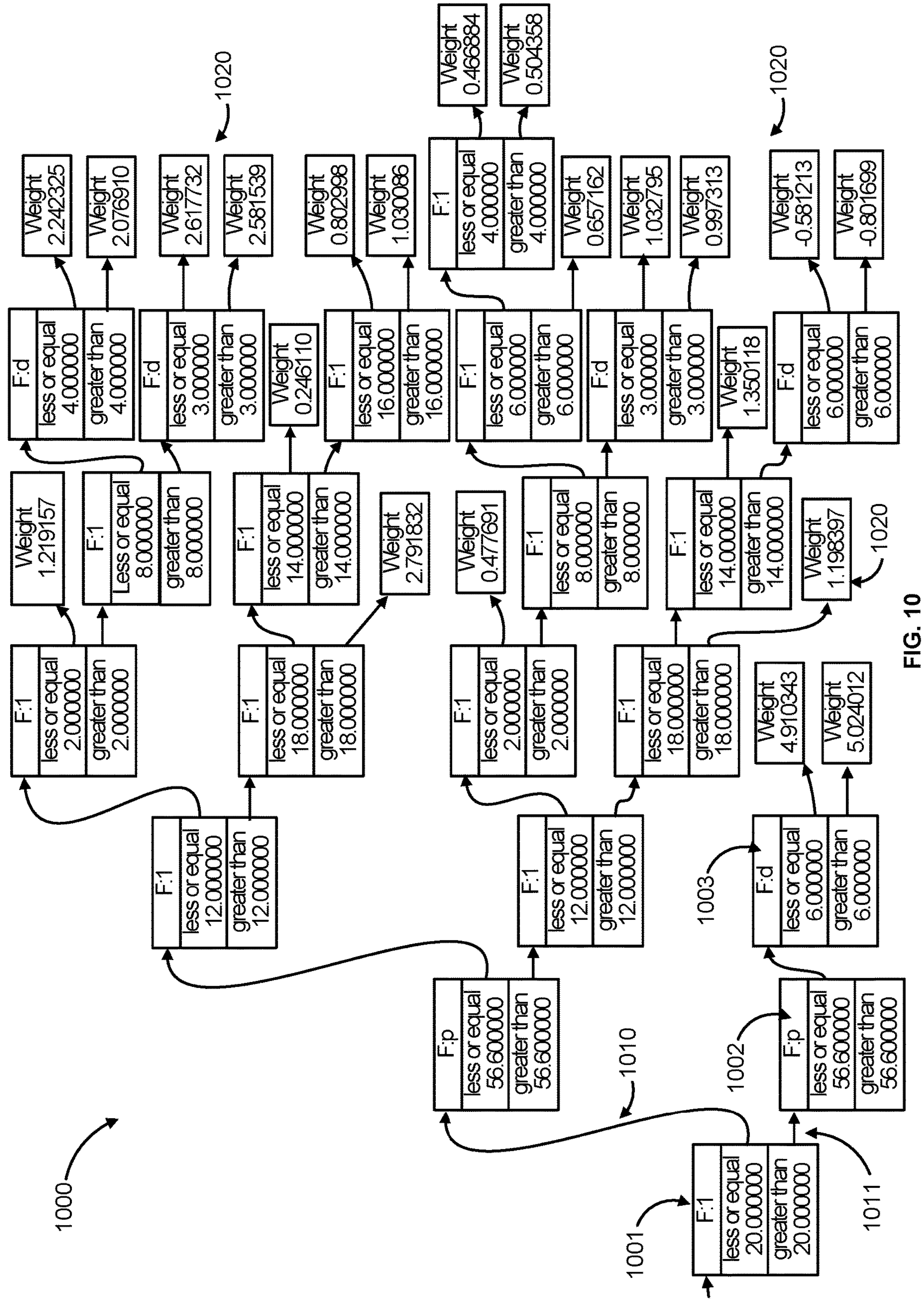
FIG. 10 shows a portion of an example regression tree for one listing's model, according to one embodiment.

FIG. 10 shows a portion 1000 of an example tree for one listing's model, according to one embodiment. In this illustration, the features of the model are lead time 1001, price 1002, and day of the week 1003. The leaf values 1020 (for example) are the likelihoods for examples that end up at that point in the tree. The leaf values 1020 may be logit likelihoods for example. Each node branches based on the value of the listed feature. For example, at the node for feature 1001, if the lead time is less than or equal to 20, the regression tree follows the upper branch 1010 (the paths from node to node and to leaves in the tree are show by dashed lines like 1010 and 1011). Alternatively, at the node for feature 1001, if the lead time is greater than 20, the regression tree follows the lower branch 1011. This process continues for each input into the regression tree model at each node until a leaf value 1020 is reached.

Figure 11:
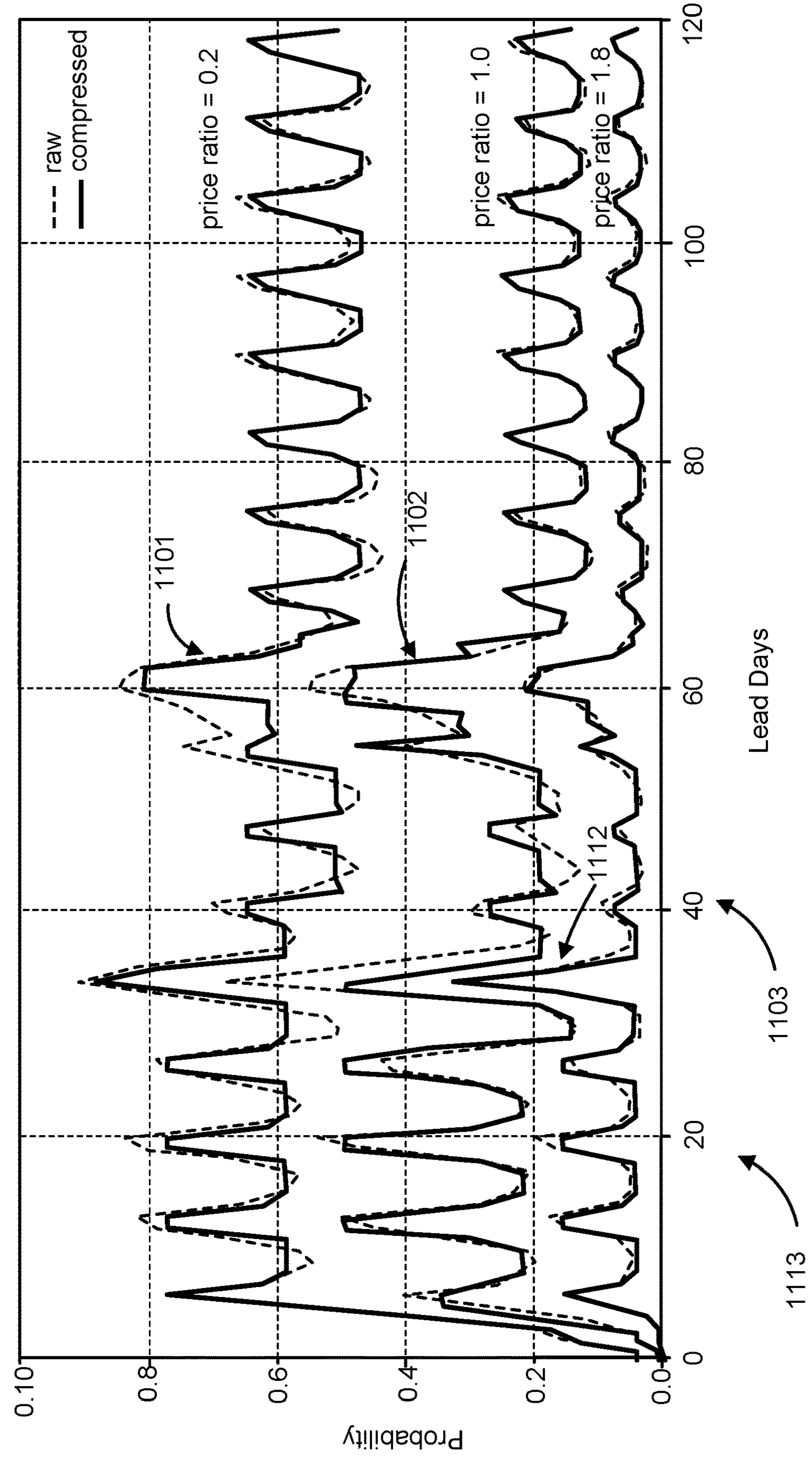
FIG. 11 illustrates the raw and compressed likelihoods of receiving a booking request for an example listings at different amounts of lead days, according to one embodiment.

FIG. 11 illustrates a raw 1101, 1102, 1103 and regression-tree compressed likelihood 1111, 1112, 1113 of receiving a booking request for two example listings at different amounts of lead days at three different price ratios according to one embodiment. The price ratio is the ratio of the test price to the pivot or current price. Note that the regression-tree compressed likelihoods 1111, 1112, 1113 provided by the regression tree models have flattened out some of the sharper peaks and valleys from the raw curves 1101, 1102, 1103.

A regression tree model can be compared against a pricing (e.g., Weibull) model as described above. One example comparison was performed for approximately 1,900 randomly selected listings in an online booking system. For each listing and future time to expiration, the demand module 213 computed price tips from three likelihood sources: 1) raw model outputs, 2) Weibull approximation, 3) regression tree approximation. An error for methods 2 and 3 relative to 1 was computed for each listing according to the following formula:

$$e = \frac{100}{\overline{p^r}L}\sum_{l}|p_l^r - p_l^a|$$

where l is the lead time index, L is the number of lead times, p's are raw (r) or approximate (a) prices, and $\overline{p^r}$ is the average over all raw prices. This may be interpreted as a normalized "percent error" of a particular approximation over the evaluation window (e.g., 120 nights).

Figure 12:
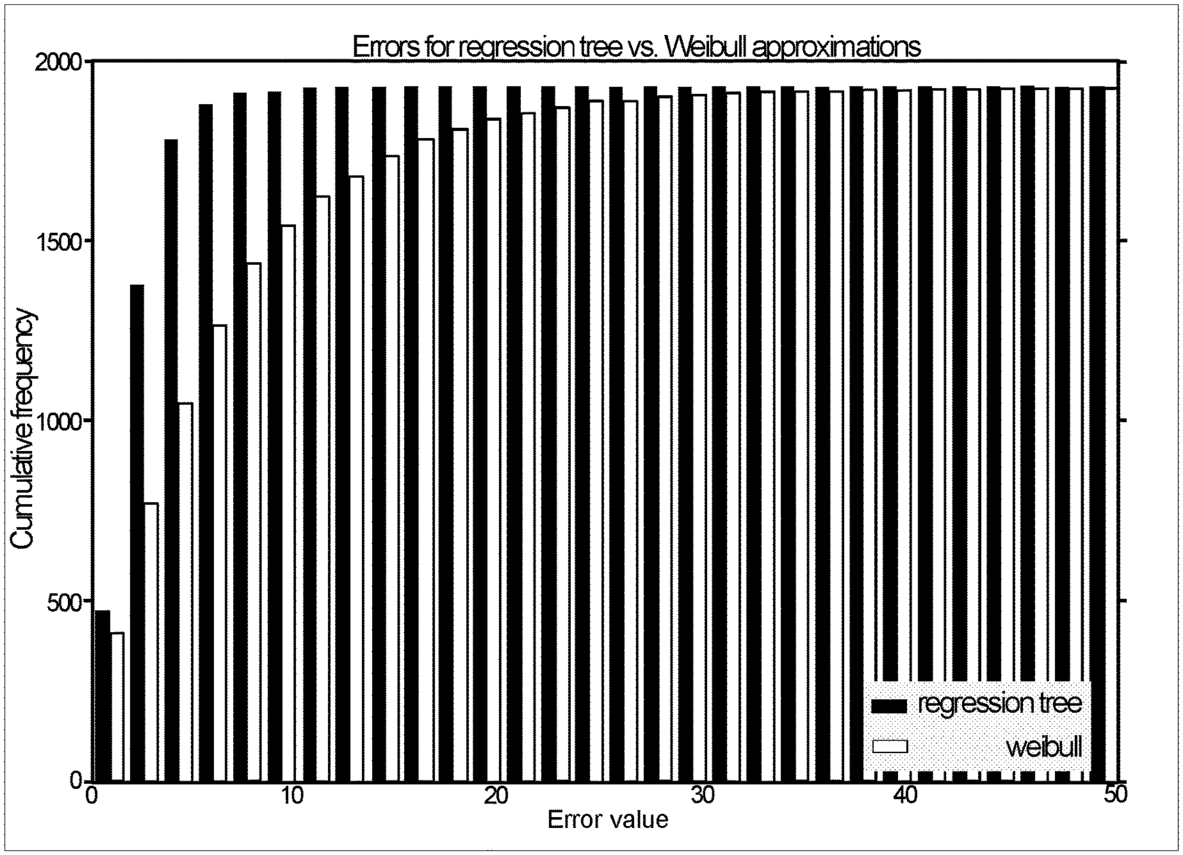
FIG. 12 illustrates a plot of the cumulative frequency of the number of listings in the test set within each error value range, according to one embodiment.

FIG. 12 illustrates a plot of the cumulative frequency of the number of listings in the test set within each error value range for a Weibull approximation and a regression tree approximation to raw model outputs, according to one embodiment. The Weibull approximation (white bars, generally shorter bars) has significantly more mass in the tail of the distribution; in particular, around 25% of listings in the test set had a Weibull error level greater than or equal to 10%. The error arises from at least two sources: 1) the raw price/likelihood curves in many cases are "S" shaped, and the Weibull approximations in their current form lose the flat regions for lower price points; and 2) when all the likelihoods are low (e.g., in the case that a listing is very over-priced), then the suggested price becomes extremely sensitive to small errors in the curves, and very small Weibull errors, particularly at high price points, can cause large errors in the output.

Figure 13A:
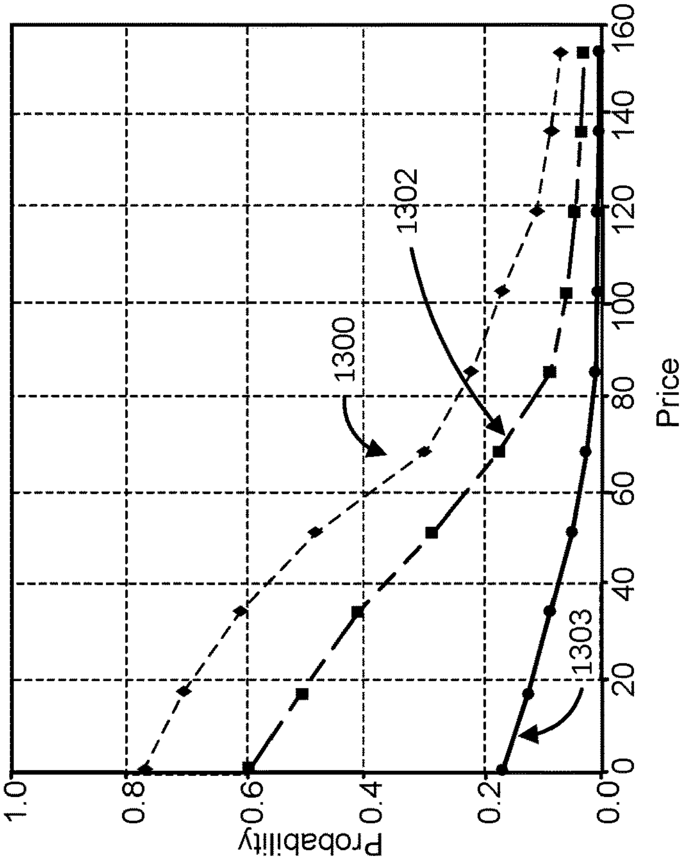
FIGS. 13A and 13B illustrate an example of source of error in according in a Weibull price curve.
Figure 13B:
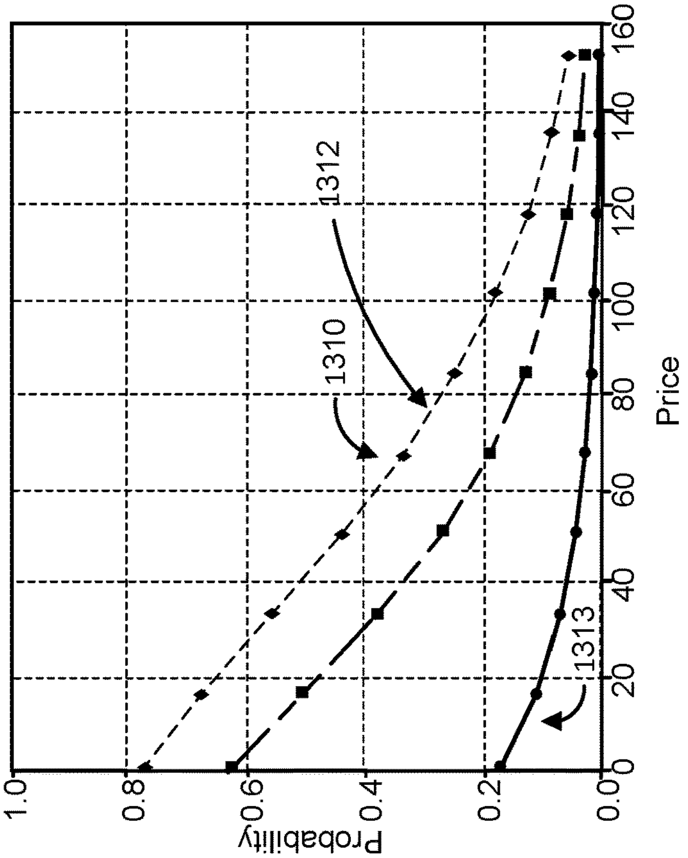

FIGS. 13A and 13B illustrate an example of the first source of error according to one embodiment. FIG. 13A shows the raw price v. likelihood curves for a single listing as a function of lead time to expiration over time. FIG. 13B shows the Weibull approximations of the same curves. In the figures, the lead time decreases from the top curves 1300, 1310 to the bottom curves 1303, 1313. As shown in 13A and 131, the raw price/likelihood curves in this example are "S" shaped, but the Weibull approximations lose the flat regions for lower price points.

Figure 14:
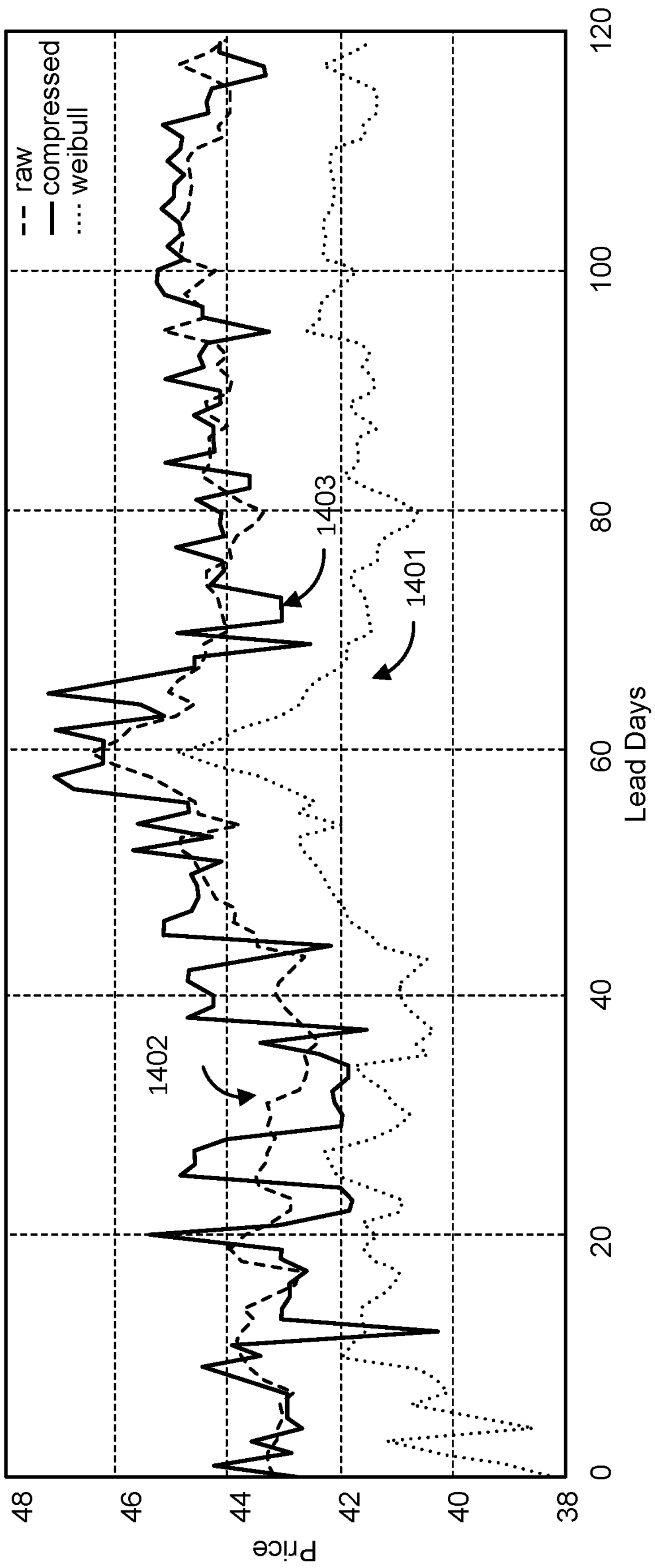
FIG. 14 illustrates the error in the price prediction in time space for raw, regression tree and Weibull likelihoods for an example listing, according to one embodiment.

FIG. 14 illustrates the error in the price plotted against lead time for raw, compressed (regression tree), and Weibull likelihoods for an example listing, according to one embodiment. Note that the bottom line 1402 (representing the Weibull-derived price) is significantly below both the raw 1401 and regression-tree compressed 1403 lines.

Figure 15:
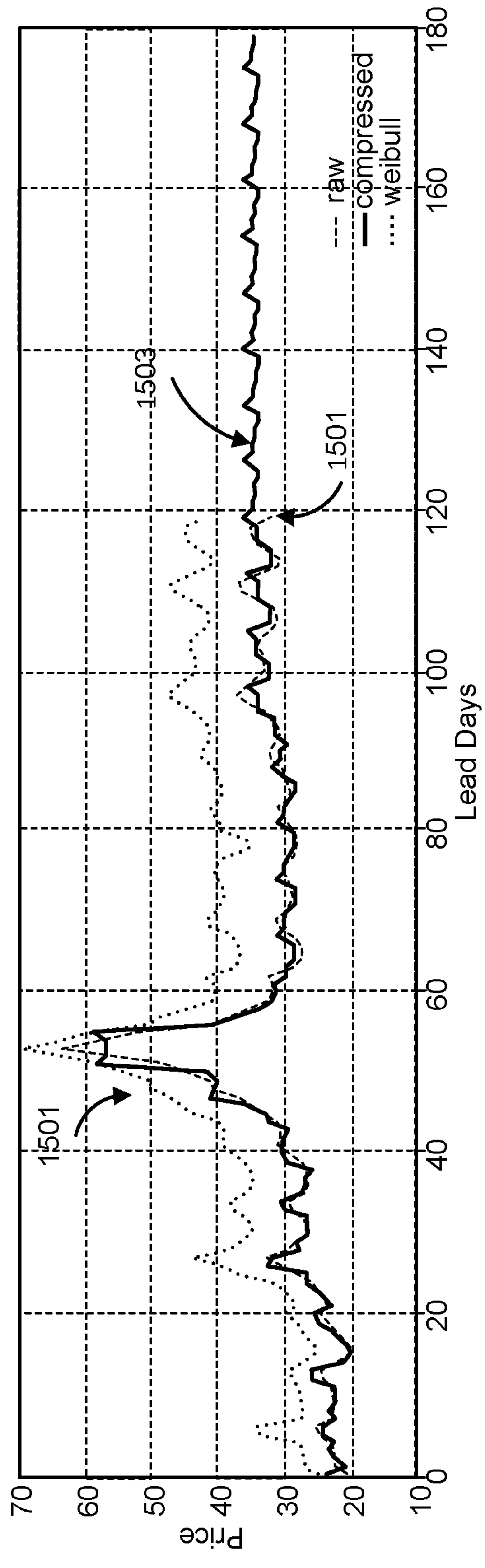
FIG. 15 illustrates likelihood curves and suggested prices for raw, Weibull, and regression tree techniques for a sample listing on the lead time interval of 0 to 180 days, according to one embodiment.

An advantage of regression tree models is that they can be used as baseline for price extrapolation. FIG. 15 illustrates suggested prices for raw 1501, Weibull 1502, and regression tree model 1503 techniques for a sample listing on the lead time interval of 0 to 180 days according to one embodiment. All values beyond 120 days lead time are extrapolated, accordingly the raw and Weibull curves stop at 120 days. As with other examples, the regression tree model more-closely approximates the raw price data in addition to providing a baseline for price extrapolation. Additional processing may be performed on the compressed likelihoods of booking generated by the regression tree model. For example, in one embodiment other features (e.g., external demand) are used to adjust the compressed likelihoods generated by the model, in order to capture high-level, price-impacting changes that occur after the end of the training window. The system may receive an indication of a change impacting the listing after training the regression tree model. For example, an event or change in circumstance may alter the demand for a listing. The system may adjust the likelihood that the time-expiring inventory will receive a transaction request at each of the extrapolation set of times to expiration based on the indication of the change.

Upon determining the regression-tree compressed 1403 curve, the demand module 213 may present a portion or data from the curve 1403 to the manager to aid in setting prices for the subject listing. Alternatively, the demand module 213 may provide price tips to the manager. In one example, price tips may be based on a threshold likelihood (the maximum price that results in the threshold likelihood of receiving a transaction request). In other examples, the price may be chosen to maximize the value of the price times the likelihood as described above.

V. Thresholding Techniques

V.A. Thresholding and Anchor Price

In one embodiment, after the demand module 213 outputs a price, one additional thresholding step may be applied. In this step an anchor price (e.g., a threshold price) is established which may be, for example, the median booked price (for listings with previous bookings) or a maximum of a percentile (e.g., 10th percentile) of the market price and the model's price for that listing. The market may be defined according to a set of feature data stored for listing, such as based on geographic location and the type of the listing (e.g., in an accommodation reservation system, 1 bedroom apartments, etc.). The demand module 213 then bounds price suggestions, for example so that those shown to managers at no less than 70% and no more than 120% of the anchor price.

V.B. Multi-Segment Threshold

This technique uses the model output likelihoods of receiving a booking request to determine when to lower the upper threshold or raise the lower threshold. If a manager has high likelihood of receiving a transaction request, the lower threshold may be raised to ensure the model does not suggest lower prices. If a manager has low likelihood of receiving a transaction request, the upper threshold may be lowered to ensure the model does not suggest higher prices. In one example embodiment, the lower threshold starts at or arrives at approximately 70% of the anchor price (or threshold price), and the upper threshold starts at or arrives at 120% of the anchor price (or threshold price).

In one embodiment, the model output likelihood may equal a sigmoid function such as:

$$likelihood=sigmoid(slope \times s+offset)$$

In the above equation, s is the raw model output, slope and offset are learned parameters, from Platt scaling for example. When s is very large or very small, the calculated likelihood enters flat regions of the sigmoid function. Accordingly, the predicted likelihood of receiving a transaction request becomes less sensitive to price changes, and the model may overestimate the booking likelihood when price goes up.

In the same or a different embodiment, a suggestion may be made to managers to lower price for booked listing-nights a large fraction (e.g., 80%) of the time. To address this, if a listing-night has high likelihood to be booked at its current price according to the model, the system may not offer a lower price as a price tip. Alternatively, if a listing-night has very low likelihood to be booked at its current price according to the model, the system may not offer a higher price as a tip.

The following conditions may be used to implement the above thresholding:

(1) If likelihood (PR)$\leq$Cutoff$_{Low}$ (where PR is the price ratio (e.g., a multiplier time the threshold price), likelihood(PR) designates the likelihood of a manager receiving a booking request at PR, and Cutoff$_{Low}$ is the lower threshold for booking likelihood), then change the upper bound for price ratio to PR; and (2) If likelihood (PR)$\geq$Cutoff$_{High}$, then change the lower price ratio bound to PR.

Example suggested cutoffs according the proposed method may vary between conservative values: Cutoff$_{Low}$=0.1, Cutoff$_{High}$=0.8, and aggressive values: aggressive: Cutoff$_{Low}$=0.2, Cutoff$_{High}$=0.35, depending upon how conservative or aggressive the system or the manager themselves sets the price tips to be. To better correct a bad suggestion, the system may set the Cutoff$_{High}$ value lower. The system may suggest lower prices for booked nights because the model predicts low booking likelihood for those nights, for example, analyses show that approximately half of booked nights have likelihood of booking less than 0.5.

In one embodiment, if likelihood(PR)$\geq$Cutoff$_{High}$ and if likelihood(1.8×PR)<0.1, then the system changes the upper price threshold to 1.1 times PR. This specific embodiment increases the suggested price tip more conservatively since the model may not necessarily predict the likelihood for extrapolated prices. This example embodiment does not take into consideration the situation of a special event that would suggest a significantly different price tip (e.g., the Super Bowl in town for a weekend near a listing, or any other rare or unexpected real world event). To handle special events like this, upper threshold is increased when such special event are detected.

V.C. Event Detection

This technique uses spikes in historical client demand for listings in advance of reoccurrence of those real-world events (usually periodic) that are going to occur in the future to detect both those events and the demand for those events in advance of their occurrence or reoccurrence. The system uses the determined knowledge that those events are going to occur to raise thresholds for price tips suggested to managers based on expected demand, so that managers are informed of more appropriate ranges of higher prices during the time period preceding and following such events.

In one embodiment, the system may generate a demand score for every DS$_{Checkin}$ (days checked in to a contracted-for time expiring inventory) day in the future. A high demand score indicates an event. The system may also use DS$_{Checkin}$ instead of DS$_{Night}$ (days until expiration) and/or use DS$_{Lead}$ (number of days between booking of a time expiring inventory and the date booked for) to group history for the inventory.

To detect events, the system may determine the demand over various periods of time. Demand may be determined based on counts of requests to book listings as a function of DS$_{Checkin}$ contacts (affirmative server indications that the client is using the contracted-for time expiring inventory) or DS$_{Night}$ contacts. Demand may also be based on aggregated measures, such as grouping counts of requests to book by DS$_{Checkin}$ or DS$_{Night}$ by groups of listings, such as by neighborhood, city, or within windows of time such as demand over a 3 day period, demand over a weekend, or demand over a week or two week period, or other aggregations.

In one embodiment, the system determines demand by aggregating contacts on the days of check in (DS$_{Checkin}$) by a client to a transacted for time expiring inventory. In one example, data for a count of a number of contacts on DS$_{Checkin}$ show a weekday effect, where weekends have higher DS$_{Checkin}$ than weekdays, and a seasonal effect, where some seasons have higher DS$_{Checkin}$ on average than others, according to one embodiment. In another embodiment M$_{Night}$ (number of nights/days contracted for the listing) may be used in place of DS$_{Checkin}$. The example of demand based on DS$_{Checkin}$ is based on the observation that most attendees (clients) of an event will attempt to check in to a transacted-for time expiring inventory very close to if not on the first day of the event. In contrast, booking and booking requests (DS$_{Night}$) may be spread out over a much longer period of time in advance of the event.

In one embodiment, the top threshold percentage of days by count of DS$_{Checkin}$ are flagged as events. Although this DS$_{Checkin}$ and contact data are historical data, they may be used to predict future events that occur on the same day or near the same day each year. For example, if a county has a cheese festival each year on the same day or weekend, contact and DS$_{Checkin}$ information can be used to predict demand by looking at prior contact/DS$_{Checkin}$ information for listings in that location from prior years.

Demand around detected events can be further characterized using lead day demands. (e.g., 30 days, 60 days). Here, the system may aggregate the count of contacts from all days within the lead days surrounding the day DS$_{Checkin}$. This aggregate count of contacts over the entire period of lead days surrounding an event can provide a fuller picture of what demand looks like surrounding the event than a count of contacts only on DS$_{Checkin}$ can. In one embodiment, events are identified by selecting the top percentage (e.g., 5%) of days DS$_{Checkin}$ by count of contacts over the period lead days surrounding that day.

Once an event is detected, the system may use the date of the event to instruct the demand module 213 that any minimum and maximum price ratios that may be used to suggest a price tip may be altered (e.g., increased) to allow for the possibility of a significantly higher price tip than would otherwise be suggested during a non-event time period. In one embodiment, specific new upper and lower bounds on the price ratio are provided to the demand module 213. Although this does not necessarily guarantee the creation of a price tip that is significantly higher than would normally be suggested for a listing or particular time expiring inventory, the historical demand (measured as above) during an event makes this more likely to be the case.

Although the description above indicates marking events as single days, in practice many events will span multiple days. Consequently, in the system more than one day detected as being an event may be marked as an event. The system may correlate these days marked as events with known or discovered real world events in order to provide this information to managers when providing a price tip, as this may help inform the manager why a significantly outside of ordinary price tip is being provided. Additionally, days marked as being events by the system may not exactly correlate with the scheduled days of a real world event. This may be due to differentiate between how people transact for time expiring inventory and when the actual event takes place. For example, clients transacting for accommodation reservation may transact for accommodations for not only the days of the event, but also for days preceding or following the event.

V. Additional Considerations

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. In one embodiment, a software module is implemented with a computer program product comprising a persistent computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, an example of which is set forth in the following claims.

What is claimed is:

1. A computer-executed method comprising:

receiving, at an online computing system associated with a booking accommodation application, a request for a price suggestion for a subject listing, the subject listing associated with a time-expiring inventory available to be booked by one of a plurality of clients of the online computing system;

generating a corpus of training data points associated with the time-expiring inventory, the training data points comprising a plurality of prices and a plurality of times until expiration of the time-expiring inventory;

generating an extrapolation set of times until expiration of the time-expiring inventory, the extrapolation set of times until expiration including times greater than those in the corpus of training data points;

inputting the extrapolation set of times until expiration into the regression tree model to determine a likelihood that the time-expiring inventory will receive a transaction request at each of the extrapolation set of times until expiration;

training a regression tree model to compress the corpus of training data points into a generalized model, the generalized model configured to output a price curve for the time-expiring inventory that is applicable regardless of which night the price curve is applied to, the compressing of the corpus of training data points enabling the regression tree model to avoid generating a separate price curve for each selectable night;

generating, using the regression tree model, the price curve for the time-expiring inventory for a given night, wherein the regression tree model represents a likelihood of receiving a transaction request for the time-expiring inventory within a duration until the time-expiring inventory expires;

determining, based on the generated price curve, a price suggestion for the time-expiring inventory and the given night; and providing the determined price suggestion for display through a user interface of the booking accommodation application on a manager computing device.

2. The computer-executed method of claim 1, further comprising:

receiving an indication of a change impacting the subject listing after training the regression tree model; and adjusting the likelihood that the time-expiring inventory will receive a transaction request at each of the extrapolation set of times until expiration based on the indication of the change.

3. The computer-executed method of claim 1, wherein determining the price suggestion comprises selecting a new price that maximizes a product of price for the time-expiring inventory multiplied by a likelihood that the time-expiring inventory will receive a transaction request for the given night.

4. The computer-executed method of claim 1, further comprising:

receiving, from the manager computing device, a selection of a threshold likelihood of receiving a transaction request for the time-expiring inventory; and determining, based on the generated price curve, a price suggestion that results in the threshold likelihood of receiving a transaction request for the given night.

5. The computer-executed method of claim 1, wherein the price suggestion comprises a maximum price that results in at least a threshold likelihood of receiving a transaction request for the time-expiring inventory and the given night.

6. A non-transitory computer-readable medium at an online computing system encoding instructions executable by a processor to:

receive, at an online computing system associated with a booking accommodation application, a request for a price suggestion for a subject listing, the subject listing associated with a time-expiring inventory available to be booked by one of a plurality of clients of the online computing system;

generate a corpus of training data points associated with the time-expiring inventory, the training data points comprising a plurality of prices and a plurality of times until expiration of the time-expiring inventory;

generate an extrapolation set of times until expiration of the time-expiring inventory, the extrapolation set of times until expiration including times greater than those in the corpus of training data points;

input the extrapolation set of times until expiration into the regression tree model to determine a likelihood that the time-expiring inventory will receive a transaction request at each of the extrapolation set of times until expiration;

train a regression tree model to compress the corpus of training data points into a generalized model, the generalized model configured to output a price curve for the time-expiring inventory that is applicable regardless of which night the price curve is applied to, the compressing of the corpus of training data points enabling the regression tree model to avoid generating a separate price curve for each selectable night;

generate, using the regression tree model, the price curve for the time-expiring inventory for a given night, wherein the regression tree model represents a likelihood of receiving a transaction request for the time-expiring inventory within a duration until the time-expiring inventory expires;

determine, based on the generated price curve, a price suggestion for the time-expiring inventory and the given night; and provide the determined price suggestion for display through a user interface of the booking accommodation application on a manager computing device.

7. The non-transitory computer-readable medium of claim 6, the non-transitory computer readable medium encoding instructions executable by the processor to:

receive an indication of a change impacting the subject listing after training the regression tree model; and adjust the likelihood that the time-expiring inventory will receive a transaction request at each of the extrapolation set of times until expiration based on the indication of the change.

8. The non-transitory computer-readable medium of claim 6, wherein determining the price suggestion comprises selecting a new price that maximizes a product of price for the time-expiring inventory multiplied by a likelihood that the time-expiring inventory will receive a transaction request for the given night.

9. The non-transitory computer-readable medium of claim 6, the non-transitory computer readable medium encoding instructions executable by the processor to:

receive, from the manager computing device, a selection of a threshold likelihood of receiving a transaction request for the time-expiring inventory; and determine, based on the generated price curve, a price suggestion that results in the threshold likelihood of receiving a transaction request for the given night.

10. The non-transitory computer-readable medium of claim 6, wherein the price suggestion comprises a maximum price that results in at least a threshold likelihood of receiving a transaction request for the time-expiring inventory and the given night.

11. A computer system comprising:

one or more computer processors for executing computer program instructions; and a non-transitory computer-readable storage medium storing instructions executable by the one or more computer processors to perform steps comprising:

receiving, at an online computing system associated with a booking accommodation application, a request for a price suggestion for a subject listing, the subject listing associated with a time-expiring inventory available to be booked by one of a plurality of clients of the online computing system;

generating a corpus of training data points associated with the time-expiring inventory, the training data points comprising a plurality of prices and a plurality of times until expiration of the time-expiring inventory;

generating an extrapolation set of times until expiration of the time-expiring inventory, the extrapolation set of times until expiration including times greater than those in the corpus of training data points;

inputting the extrapolation set of times until expiration into the regression tree model to determine a likelihood that the time-expiring inventory will receive a transaction request at each of the extrapolation set of times until expiration;

training a regression tree model to compress the corpus of training data points into a generalized model, the generalized model configured to output a price curve for the time-expiring inventory that is applicable regardless of which night the price curve is applied to, the compressing of the corpus of training data points enabling the regression tree model to avoid generating a separate price curve for each selectable night;

generating, using the regression tree model, the price curve for the time-expiring inventory for a given night, wherein the regression tree model represents a likelihood of receiving a transaction request for the time-expiring inventory within a duration until the time-expiring inventory expires;

determining, based on the generated price curve, a price suggestion for the time-expiring inventory and the given night; and providing the determined price suggestion for display through a user interface of the booking accommodation application on a manager computing device.

12. The computer system of claim 11, wherein the steps further comprise:

receiving an indication of a change impacting the subject listing after training the regression tree model; and adjusting the likelihood that the time-expiring inventory will receive a transaction request at each of the extrapolation set of times until expiration based on the indication of the change.

13. The computer system of claim 11, wherein determining the price suggestion comprises selecting a new price that maximizes a product of price for the time-expiring inventory multiplied by a likelihood that the time-expiring inventory will receive a transaction request for the given night.

14. The computer system of claim 11, wherein the steps further comprise:

receiving, from the manager computing device, a selection of a threshold likelihood of receiving a transaction request for the time-expiring inventory; and determining, based on the generated price curve, a price suggestion that results in the threshold likelihood of receiving a transaction request for the given night.

* * * * *